(12) United States Patent
Ohmae et al.

(10) Patent No.: US 10,547,396 B2
(45) Date of Patent: Jan. 28, 2020

(54) STATE DISPLAY APPARATUS, STATE DISPLAY SYSTEM, AND RADIO TRANSMISSION APPARATUS

(71) Applicant: OMRON Corporation, Kyoto-shi, Kyoto (JP)

(72) Inventors: Soji Ohmae, Nara (JP); Hajime Umeki, Soraku-gun (JP); Junji Obata, Osaka (JP); Yasushi Kawashima, Kusatsu (JP); Hiroshi Okabe, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 12 days.

(21) Appl. No.: 15/904,667

(22) Filed: Feb. 26, 2018

(65) Prior Publication Data

US 2018/0309524 A1   Oct. 25, 2018

(30) Foreign Application Priority Data

Apr. 25, 2017   (JP) ................. 2017-086335

(51) Int. Cl.
*H04B 17/23* (2015.01)
*H04W 24/08* (2009.01)
*H04B 17/318* (2015.01)
*H04W 16/20* (2009.01)

(52) U.S. Cl.
CPC ......... *H04B 17/23* (2015.01); *H04B 17/318* (2015.01); *H04W 24/08* (2013.01); *H04W 16/20* (2013.01)

(58) Field of Classification Search
CPC .... H04W 24/08; H04W 16/20; H04B 17/318; H04B 17/23; H04B 17/26; H04Q 2209/10; H04Q 2209/40; H04Q 9/00

USPC ........................................ 455/67.7
See application file for complete search history.

(56) References Cited

U.S. PATENT DOCUMENTS

| 6,289,207 | B1* | 9/2001 | Hudecek | H04B 1/205 455/150.1 |
| 2011/0181745 | A1* | 7/2011 | Nagatsuma | H04N 1/00129 348/220.1 |
| 2017/0013547 | A1* | 1/2017 | Skaaksrud | H04W 4/80 |

FOREIGN PATENT DOCUMENTS

| CN | 202 998 112 | * | 6/2013 |
| CN | 202998112 U | | 6/2013 |
| JP | 2004/185383 | * | 7/2004 |
| JP | 2004-185383 A | | 7/2004 |
| JP | 2011-151700 A | | 8/2011 |

(Continued)

OTHER PUBLICATIONS

The extended European search report (EESR) dated Sep. 3, 2018 in a counterpart European patent application.

*Primary Examiner* — Edward F Urban
*Assistant Examiner* — Angelica M Perez
(74) *Attorney, Agent, or Firm* — Metrolex IP Law Group, PLLC

(57) ABSTRACT

A state display apparatus includes a plurality of state display LEDs and a plurality of margin display LEDs, and when receiving a radio signal indicating that a state of a management object has changed, performs light on/off control of a state display LED associated with the management object, and controls a margin display LED arranged above the state display LED so that whether or not a reception strength of the received radio signal is equal to or higher than a prescribed threshold is indicated by a lighted state/a turned-off state of the margin display LED on/off.

6 Claims, 15 Drawing Sheets

(56) References Cited

FOREIGN PATENT DOCUMENTS

| | | | |
|---|---|---|---|
| KR | 2011 0011039 | * | 2/2011 |
| KR | 2011-0011039 A | | 2/2011 |

* cited by examiner

US 10,547,396 B2

STATE DISPLAY APPARATUS, STATE DISPLAY SYSTEM, AND RADIO TRANSMISSION APPARATUS

TECHNICAL FIELD

The present invention relates to a state display apparatus, a state display system, and a radio transmission apparatus.

BACKGROUND ART

There is an available technology where radio transmission apparatuses in which a radio signal transmission function is added to a switch are arranged at various locations of a production line or the like and, based on radio signals from the respective radio transmission apparatuses, a single apparatus (hereinafter, described as a state display apparatus) displays states of the various locations. Moreover, a radio transmission apparatus in which a radio signal transmission function is added to a switch is also referred to as a radio switch or the like.

When constructing a system (hereinafter, described as a state display system) by combining a plurality of the radio transmission apparatuses with the state display apparatus described above, a position of each apparatus is determined so that communication between each radio transmission apparatus and the state display apparatus can be carried out in a favorable manner. However, there may be cases where, after the state display system is constructed, the addition of some kind of equipment to the production line or the like prevents communication between some of the radio transmission apparatuses and the state display apparatus from being favorably performed. In addition, there may be cases where a failure of some of the radio transmission apparatuses and/or the state display apparatus prevents communication between some of the radio transmission apparatuses and the state display apparatus from being favorably performed.

Therefore, a technique is desired which enables a user to comprehend that communication between a radio transmission apparatus and a state display apparatus can no longer be carried out in a favorable manner.

PRIOR ART REFERENCES

Patent Literature 1: Japanese patent laid-open publication No. 2011-151700

SUMMARY OF THE INVENTION

The present invention has been made in consideration of the present situation described above and an object thereof is to provide a technique which enables a user to comprehend that communication between a radio transmission apparatus and a state display apparatus can no longer be carried out in a favorable manner.

In order to solve the problem described above, a state display apparatus according to a first aspect of the present invention includes: a receiving unit which receives a radio signal transmitted by each of a plurality of radio transmission apparatuses, the radio signal indicating that a change has occurred in a state of a management object associated with a radio transmission apparatus that is a transmission source of the radio signal; a display unit which displays a current state of each management object and which displays a margin of communication by the radio signal between the state display apparatus and each radio transmission apparatus; and a control unit which, based on a radio signal received by the receiving unit, specifies a management object for which a change in a state thereof is notified by the radio signal and a state of the management object after the change, which causes the display unit to display the specified state after the change as a current state of the specified management object, which obtains, from a reception strength of a radio signal received by the receiving unit, a margin of communication by the radio signal between the state display apparatus and a radio transmission apparatus that is a transmission source of the radio signal, and which causes the display unit to display the obtained margin of communication.

In other words, the state display apparatus according to the first aspect of the present invention has a configuration in which a margin of communication by a radio signal between the state display apparatus and each radio transmission apparatus is displayed on a display unit. Consequently, a user (a manager of the state display apparatus or the like) can comprehend, from each margin displayed on the display unit of the state display apparatus, a radio transmission apparatus no longer capable of communicating in a favorable manner and determine a first action of failure recovery measures. Therefore, with the state display apparatus according to the first aspect of the present invention, a total number of man-hours required for solving a radio failure can be reduced.

The state display apparatus according to the first aspect of the present invention may adopt a configuration in which "the display unit includes a plurality of light emitting element pairs respectively associated with different management objects, each of the plurality of light emitting element pairs includes a first light emitting element and a second light emitting element, and the control unit causes the first light emitting element of the light emitting element pair associated with the specified management object to operate in an operational state in accordance with the specified state after the change, and causes the second light emitting element of the light emitting element pair associated with the specified management object to operate in an operational state in accordance with the obtained margin of communication". The control unit according to this configuration may cause each of the first light emitting element and the second light emitting element to operate in at least two operational states. In addition, the two or more operational states in which each light emitting element operates may be any kind of operational state (a lighted state, a turned-off state, a blinking state, a state where light is emitted in a first color, a state where light is emitted in a second color, and the like) as long as the operational states differ from one another.

In addition, the state display apparatus according to the first aspect of the present invention may adopt a configuration in which "the display unit includes a plurality of light emitting elements respectively associated with different management objects, and the control unit causes the light emitting element associated with the specified management object to operate in an operational state in accordance with a combination of the specified state after the change and the obtained margin of communication". The control unit according to this configuration may cause the light emitting elements to operate in at least four operational states. For example, a control unit may be adopted which, when each light emitting element is a color light emitting element, causes the light emitting element associated with the specified management object to emit light in a color in accordance with a combination of the specified state after the change and the obtained margin of communication.

In addition, the state display apparatus according to the first aspect of the present invention may adopt a configuration which "further includes an instruction accepting unit which accepts a history display instruction, wherein the control unit stores, each time a radio signal received by the receiving unit is processed, history information indicating a state of the management object and a margin of communication by the radio signal displayed by the display unit, in a storage apparatus, and when a history display instruction is accepted by the instruction accepting unit, causes the display unit to display, based on history information stored in the storage apparatus, a state of each management object and a margin of communication by the radio signal between the state display apparatus and each radio transmission apparatus that have been previously displayed on the display unit". When adopting this configuration, a configuration may be further adopted in which "the control unit stores the history information in the storage apparatus in a form which enables an order of storage in the storage apparatus to be understood, the instruction accepting unit accepts a history display instruction designating, in an order of storage in the storage apparatus, history information of each management object to be used to display history, and when a history display instruction is accepted by the instruction accepting unit, the control unit causes the display unit to display, based on history information of each management object for which an order of storage in the storage apparatus matches an order designated by the display instruction, a state of each management object and a margin of communication by the radio signal between the state display apparatus and each radio transmission apparatus that have been previously displayed on the display unit".

In addition, the state display apparatus according to the first aspect of the present invention may adopt a configuration which "further includes an instruction accepting unit which accepts a history display instruction accompanied by a designation of a management object to be a display object of history, wherein the control unit stores, each time a radio signal received by the receiving unit is processed, history information indicating a state of the management object and a margin of communication by the radio signal displayed by the display unit, in a storage apparatus in a form which enables an order of storage in the storage apparatus to be understood, and when a history display instruction is accepted by the instruction accepting unit, causes the display unit to display, based on a plurality of pieces of latest history information with respect to a management object designated in the history display instruction, a state and a margin of communication of each management object indicated by each of the plurality of pieces of history information".

By adopting a configuration including an instruction accepting unit as described above, the user can confirm a previous margin of communication by a radio signal for each management object. In addition, when communication between a certain radio transmission apparatus and the state display apparatus is interfered with by an object passing between the two apparatuses, the margin of communication with the radio transmission apparatus recovers after being reduced. Furthermore, when a problem occurs in a communication function of a certain radio transmission apparatus and/or the state display apparatus, the margin of communication with the radio transmission apparatus remains in a reduced state. Moreover, when a problem occurs in a communication function of the state display apparatus, normally, a problem occurs in radio communication between the state display apparatus and all radio transmission apparatuses. Therefore, adopting the configuration described above enables a state display apparatus to be realized in which whether a communication failure is caused by a radio transmission apparatus, the state display apparatus, or an object existing between a radio transmission apparatus and the state display apparatus can be estimated from information displayed on the display unit.

In order to solve the problem described above, a state display apparatus according to a second aspect of the present invention includes: a receiving unit which receives a radio signal transmitted by each of a plurality of radio transmission apparatuses, the radio signal indicating that a change has occurred in a state of a management object associated with a radio transmission apparatus that is a transmission source of the radio signal; an accepting unit which accepts a designation of a management object to be a display object of a margin of communication by the radio signal; a display unit which displays a current state of each management object and which displays a margin of communication by the radio signal between the state display apparatus and the management object designated as a display object of a margin of communication; and a control unit which, based on a radio signal received by the receiving unit, specifies a management object for which a change in a state thereof is notified by the radio signal and a state of the management object after the change, which causes the display unit to display the specified state after the change as a current state of the specified management object and, when the specified management object is a management object designated as the display object of a margin of communication, further obtains a margin of communication by the radio signal from a reception strength of a radio signal received by the receiving unit and causes the display unit to display the obtained margin of communication.

In other words, the state display apparatus according to the second aspect of the present invention has a configuration in which, by designating a management object of which a margin of communication is to be displayed (a management object to be a display object of a margin of communication), a margin of communication between the state display apparatus and a radio transmission apparatus transmitting a radio signal indicating that a state of the management object has changed is displayed on a display unit. Consequently, by sequentially changing management objects, the user can learn a margin of communication between the state display apparatus and each radio transmission apparatus. Therefore, even with the state display apparatus according to the second aspect of the present invention, since the user can comprehend that communication with a radio transmission apparatus can no longer be performed in a favorable manner and determine a first action of failure recovery measures, a total number of man-hours required for solving a radio failure can be reduced.

The state display apparatus according to the second aspect of the present invention can be realized in various forms. For example, the state display apparatus according to the second aspect of the present invention can be realized as an apparatus in which "the display unit includes a segment display, the control unit causes a numerical value indicating a margin of communication by the radio signal to be displayed on the segment display of the display unit when the specified management object is a management object designated as a display object of a margin of communication" or an apparatus in which "the display unit includes a light emitting element, and the control unit causes the light emitting element of the display unit to blink in a pattern in accordance with a margin of communication by the radio signal when the specified management object is a management object designated as a display object of a margin of communication".

In addition, the state display apparatus according to the second aspect of the present invention can be realized as an apparatus in which "the display unit includes a plurality of light emitting elements which display a margin of communication by the radio signal, and the control unit changes the number of light emitting elements to be lighted among the plurality of light emitting elements of the display unit in accordance with a margin of communication by the radio signal when the specified management object is a management object designated as a display object of a margin of communication".

Furthermore, the state display apparatus according to the second aspect of the present invention may adopt a configuration in which "a radio signal received by the receiving unit includes a device ID of a radio transmission apparatus having transmitted the radio signal, and the control unit: holds correspondence relationship information indicating a correspondence relationship between each management object and a device ID of one or more radio transmission apparatuses transmitting a radio signal indicating that a state of each management object has changed; stores, each time a radio signal is received by the receiving unit, a margin of communication obtained from a reception strength of the received radio signal in association with a device ID included in the radio signal, in a storage apparatus; and when a management object of which a state is notified to have changed by a radio signal received by the receiving unit is a management object designated as a display object of a margin of communication, specifies, based on the correspondence relationship information, a device ID of each radio transmission apparatus which transmits a radio signal indicating that the state of the management object has changed and which is not a transmission source of a current radio signal, and causes the display unit to display a margin of communication stored in the storage apparatus in association with each specified device ID and a margin of communication obtained from a reception strength of the current radio signal".

Adopting this configuration for the state display apparatus according to the second aspect enables a radio transmission apparatus incapable of communicating with the state display apparatus in a favorable manner to be specified even when a plurality of radio transmission apparatuses that transmit a radio signal indicating that a state of each management object has changed are arranged in a vicinity of several management objects. Specifically, let us consider a case where a plurality of radio transmission apparatuses that transmit a radio signal indicating that a state of a certain management object has changed are arranged in a vicinity of the management object and a problem occurs in communication between the state display apparatus and one of the plurality of radio transmission apparatuses. In this case, each state display apparatus not configured as described above can realize that a problem in communication has occurred between the state display apparatus and one of the plurality of radio transmission apparatuses but cannot recognize with which radio transmission apparatus communication is problematic. On the other hand, adopting the configuration described above enables a margin of communication between the state display apparatus and each radio transmission apparatus to be comprehended. Therefore, adopting the configuration described above enables a radio transmission apparatus incapable of communicating with the state display apparatus in a favorable manner to be specified even when a plurality of radio transmission apparatuses that transmit a radio signal indicating that a state of each management object has changed are arranged in a vicinity of several management objects.

As long as the radio transmission apparatus used in combination with the state display apparatuses according to the respective modes of the present invention is an apparatus capable of transmitting a radio signal indicating that a state of a management object has changed, the radio transmission apparatus may be an apparatus which generates power from an operating force of a user and transmits the radio signal using generated power or an apparatus which transmits the radio signal using power from a battery or a commercial power supply.

In addition, a state display system may be constituted by: the state display apparatus according to any one of the above described embodiments, further including a transmitting unit which transmits a second radio signal which indicates a margin of communication obtained from a reception strength of a radio signal received by the receiving unit and which is addressed to a radio transmission apparatus that is a transmission source of the radio signal; and a plurality of radio transmission apparatuses each transmitting the radio signal, and including a radio transmission apparatus-side receiving unit which receives the second radio signal addressed to its own radio transmission apparatus from the state display apparatus, a display unit which displays a margin of communication, and a control unit which causes the display unit to display a margin of communication based on the second radio signal which is addressed to its own radio transmission apparatus and which is received by the radio transmission apparatus-side receiving unit.

In the state display system having the configuration described above, a margin of communication by a radio signal from each radio transmission apparatus is displayed on the display unit of each radio transmission apparatus. Consequently, a user (an operator) of each radio transmission apparatus can comprehend whether or not communication from the radio transmission apparatus operated by the user can no longer be performed in a favorable manner. Therefore, with the state display system having the configuration described above, an occurrence of a problem can be comprehended proportionately earlier.

According to the present invention, since a user can comprehend radio communication which can no longer be performed in a favorable manner and determine a first action of failure recovery measures, a total number of man-hours required for solving a radio failure can be reduced.

DESCRIPTION OF EMBODIMENTS

Hereinafter, embodiments of the present invention will be described based on embodiments with reference to the drawings.

First Embodiment

Figure 1:
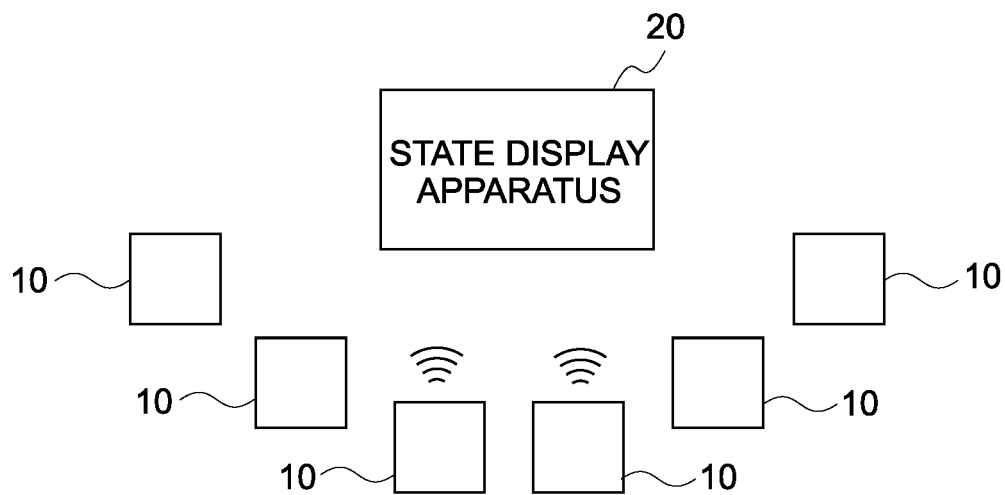
FIG. 1 is a schematic configuration diagram of a state display system according to a first embodiment of the present invention.

FIG. 1 shows a schematic configuration of a state display system according to a first embodiment of the present invention. First, an overview of the state display system according to the present embodiment will be provided using FIG. 1.

As shown in FIG. 1, the state display system according to the present embodiment includes a plurality of radio transmission apparatuses 10 and one state display apparatus 20.

The present state display system is a system in which states of a plurality of management objects are displayed on a front panel (details to be provided later) of the state display apparatus 20. Moreover, a management object refers to an apparatus (an automatic door, a manufacturing apparatus, or the like) inside a facility (a plant or the like), a task to be performed by an apparatus or a person, and the like.

Each radio transmission apparatus 10 of the state display system is an apparatus which transmits a radio signal in a prescribed format including a device ID that is identification information of the radio transmission apparatus 10 and any of two types of control output information (hereinafter, described as ON information and OFF information) when a prescribed operation is performed.

The radio transmission apparatuses 10 include a first radio transmission apparatus 10 and a second radio transmission apparatus 10. The second radio transmission apparatus 10 is an apparatus which a user can selectively cause to transmit a radio signal including ON information and a radio signal including OFF information. The first radio transmission apparatus 10 is an apparatus which, when being operated by the user, transmits whichever radio signal is set in advance between a radio signal including ON information and a radio signal including OFF information.

During setup of the state display system, the state display apparatus 20 is installed at a location as close to each management object as possible, and each radio transmission apparatus 10 is installed in a fixed manner on a facility structure or the like in a vicinity of each management object. The radio transmission apparatus 10 need not necessarily be fixed and may be mounted to a moving body such as a forklift to be used inside the facility.

In addition, when arranging the state display apparatus 20, an installation location is selected so that an interval between the state display apparatus 20 and each radio transmission apparatus 10 is equal to or less than a maximum communication range (normally, 50 to 100 m) of the radio transmission apparatus 10. When the radio transmission apparatus 10 is mounted to a moving body, an arrangement location is selected based on an assumed location of the moving body where a management object needs to be operated.

Hereinafter, the state display system according to the first embodiment will be described in more specific terms.

First, the first radio transmission apparatus 10 that is an apparatus which, when being operated by the user, transmits whichever radio signal is set in advance between a radio signal including ON information and a radio signal including OFF information will be described.

Figure 2:
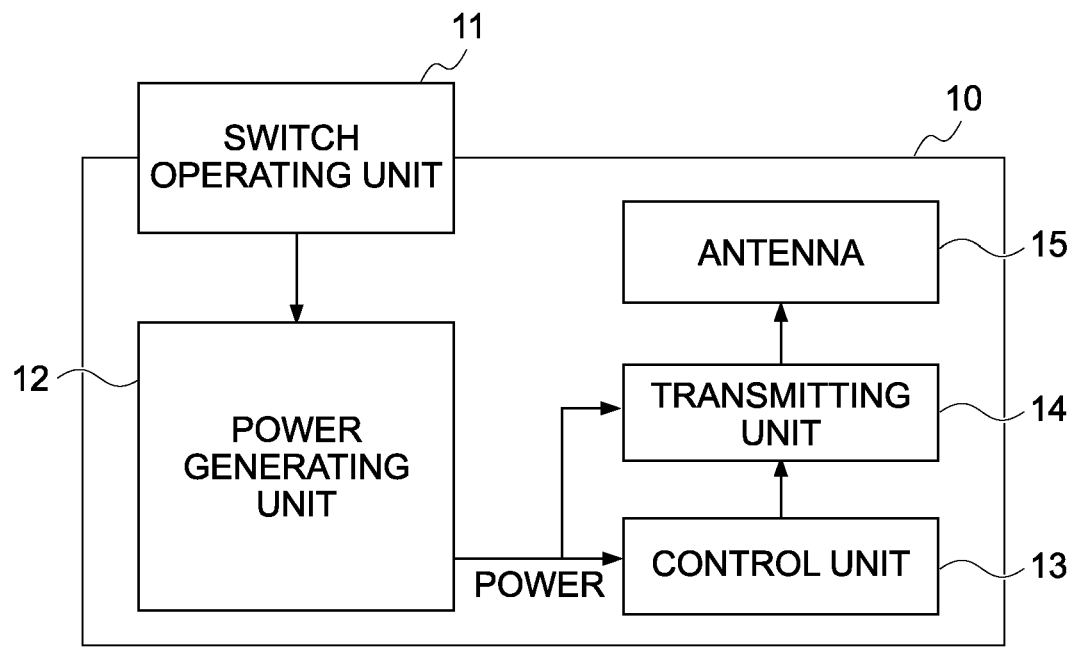
FIG. 2 is a schematic configuration diagram of a radio transmission apparatus of a state display system according to the first embodiment.

FIG. 2 shows a schematic configuration of the first radio transmission apparatus 10. As illustrated, the first radio transmission apparatus 10 includes a switch operating unit 11, a power generating unit 12, a control unit 13, a transmitting unit 14, and an antenna 15.

The switch operating unit 11 is a mechanism constituted by a push button, a spring for pushing back the push button having been pressed down, and the like. The power generating unit 12 is a unit which performs power generation based on a pressing force on the push button of the switch operating unit 11. The power generating unit 12 according to the present embodiment is constituted by a power generating mechanism which generates electric energy by converting a movement of the push button into a relative movement between a coil and a magnet, a bridge circuit which rectifies an output of the power generating mechanism, a capacitor which is charged by an output from the bridge circuit, and a regulator which regulates a voltage between terminals of the capacitor into a prescribed voltage. In other words, the power generating mechanism of the power generating unit 12 according to the present embodiment is configured to perform power generation by electromagnetic induction. Alternatively, the power generating mechanism of the power generating unit 12 may generate electric energy by transmitting a pressing force applied to the push button to a piezoelectric element.

The transmitting unit 14 is a unit which modulates a signal of which transmission is instructed by the control unit 13 and transmits the modulated signal from the antenna 15, and which is operated by power from the power generating unit 12. The control unit 13 is also a unit which is operated by power from the power generating unit 12. The control unit 13 is constituted by an integrated circuit (a microprocessor, a digital encoder, or the like), a setting mechanism (a dip switch or a jumper pin) which allows the user to set either ON information or OFF information as control output information to be included in a radio signal, and the like. A device ID is set to the integrated circuit of the control unit 13, and when power is supplied to the control unit 13 (the integrated circuit) from the power generating unit 12 (or in other words, when the push button is pressed down), the control unit 13 instructs the transmitting unit 14 to transmit a radio signal including the set device ID and control output information.

Next, the second radio transmission apparatus 10 that is an apparatus which enables a user to selectively transmit a radio signal including ON information and a radio signal including OFF information will be described with reference to FIG. 2.

The second radio transmission apparatus 10 is also an apparatus which operates by converting a pressing force applied to a push button into electric energy in a similar manner to the first radio transmission apparatus 10. Specifically, the second radio transmission apparatus 10 includes two pairs of the switch operating unit 11 and the power generating unit 12, a pair of the control unit 13 and the transmitting unit 14 connected to the two power generating units 12 so that the pair of the control unit 13 and the transmitting unit 14 can be operated by power from either of the power generating units 12, and one antenna 15. In addition, when power is supplied from one power generating unit 12, the control unit 13 of the second radio transmission apparatus 10 causes the transmitting unit 14 to transmit a radio signal including a device ID and ON information, and when power is supplied from the other power generating unit 12, the control unit 13 of the second radio transmission apparatus 10 causes the transmitting unit 14 to transmit a radio signal including the device ID and OFF information.

Hereinafter, the state display apparatus 20 will be described.

Figure 3:
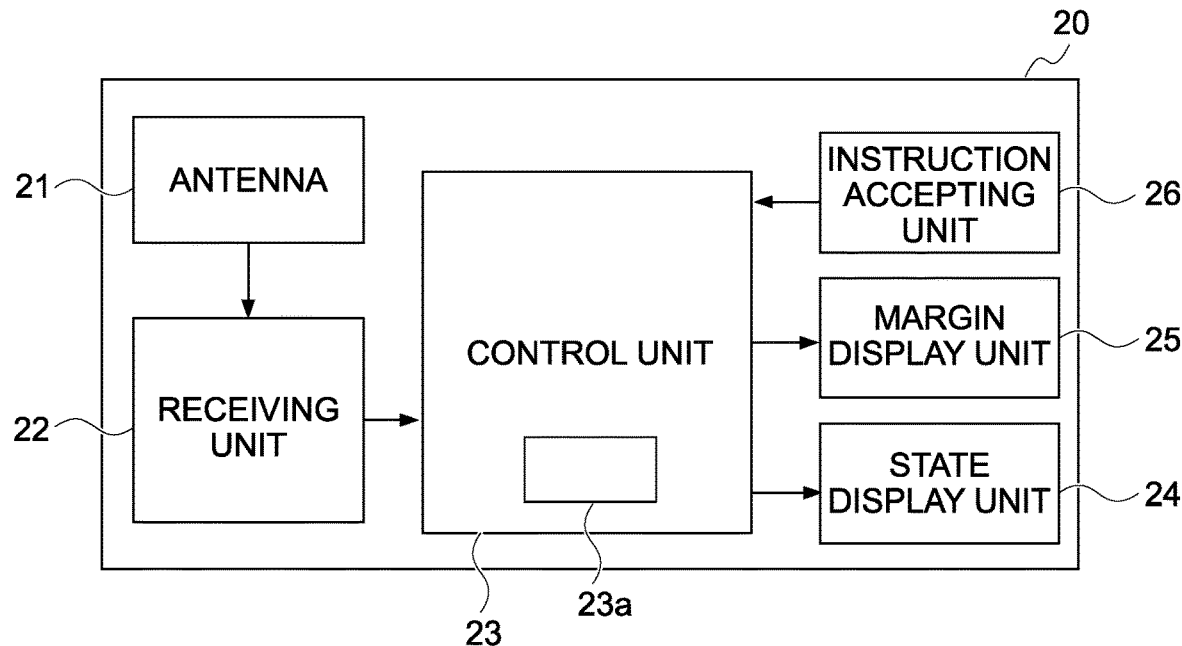
FIG. 3 is a schematic configuration diagram of a state display apparatus of a state display system according to the first embodiment.
Figure 4:
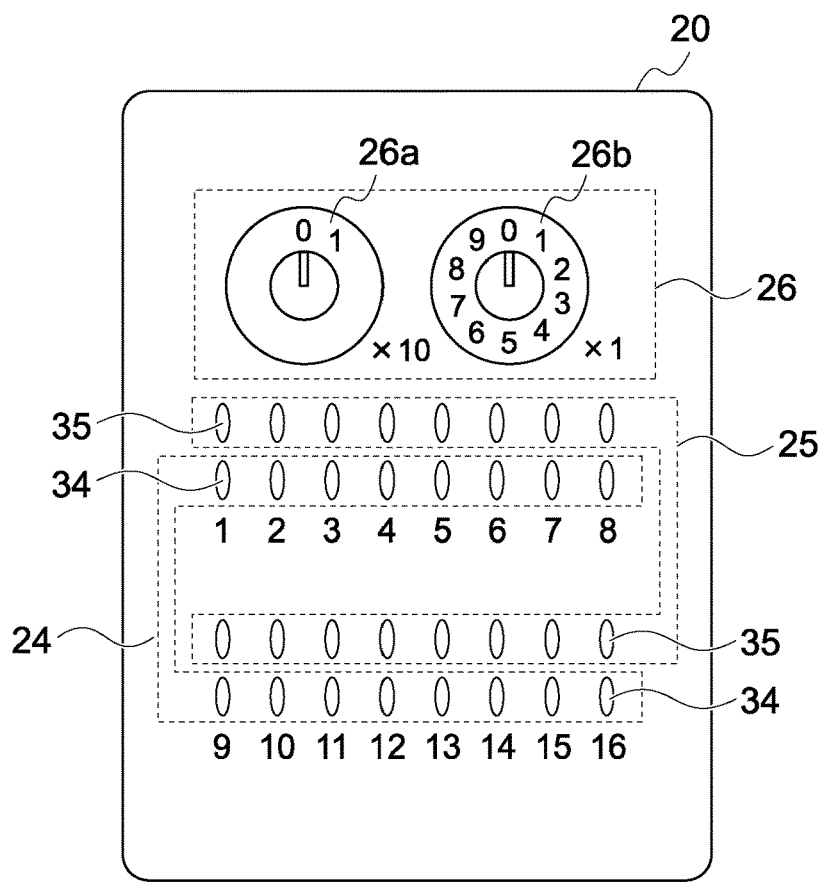
FIG. 4 is a schematic external view of a state display apparatus of a state display system according to the first embodiment.

FIGS. 3 and 4 respectively show a schematic configuration diagram and a schematic external view of the state display apparatus 20.

As shown in FIG. 3, the state display apparatus 20 includes an antenna 21, a receiving unit 22, a control unit 23, a state display unit 24, a margin display unit 25, and an instruction accepting unit 26. Moreover, the state display apparatus 20 is an apparatus used when connected to a commercial power supply. Therefore, the state display apparatus 20 also includes a power supply circuit (not illustrated) which steps down voltage from the commercial power supply and supplies a step-down voltage to each unit. In addition, the state display apparatus 20 also includes a communication interface (not illustrated: in the present embodiment, a USB interface) for communicating with a computer.

The receiving unit 22 is a unit which receives a radio signal from each radio transmission apparatus 10 via the antenna 21 and which notifies the control unit 23 of a device ID and control output information in the received radio signal together with a reception strength (received signal strength indicator: RSSI) of the received radio signal. When the reception strength of the received radio signal is below a sufficient strength (hereinafter, described as a prescribed strength) to comprehend contents of the radio signal, the receiving unit 22 does not notify anything to the control unit 23. In other words, only when the receiving unit 22 receives a radio signal having a prescribed strength or more, the receiving unit 22 notifies the control unit 23 of a device ID and control output information included in the received radio signal and a reception strength prescribed strength) of the radio signal.

The state display unit 24 is a unit which displays a state of each management object. The margin display unit 25 is a unit which displays a margin of communication between the state display apparatus 20 and the radio transmission apparatus 10 arranged in a vicinity of each management object. As shown in FIG. 4, the state display unit 24 of the state display apparatus 20 according to the present embodiment is constituted by 16 state display light emitting diodes (LEDs) 34 arranged on the front panel of the state display apparatus 20. The margin display unit 25 is constituted by 16 margin display LEDs 35 arranged on the front panel of the state display apparatus 20.

The instruction accepting unit 26 (FIG. 3) is a unit which accepts a display instruction of a monitoring history (a previous monitoring result of a state and a margin) from the user. As shown in FIG. 4, the instruction accepting unit 26 is constituted by two rotary switches 26a and 26b arranged on the front panel of the state display apparatus 20. Values of the rotary switches 26a and 26b at normal time (when a monitoring history is not displayed) are both 0. When desiring to check a monitoring history, the user operates the rotary switches 26a and 26b so that "value of rotary switch 26a×10+value of rotary switch 26b" (hereinafter, referred to as a designated value S) ranges from 1 to 16.

The control unit 23 is a unit constituted by a processor (a CPU or a microprocessor), a storage apparatus 23a (in the present embodiment, a ROM and a RAM), and the like. The storage apparatus 23a (ROM) stores a program created to be used by the state display apparatus 20, and when the processor reads the program onto the RAM and executes the program, the control unit 23 functions as a unit which performs various processes.

Hereinafter, processes performed by the control unit 23 will be described. Moreover, although details will be provided later, the state display LEDs 34 and the margin display LEDs 35 vertically arranged on the front panel of the state display apparatus 20 form a pair to be used to display information related to a same management object. Therefore, in the following description, each of the state display LEDs 34 arranged on the front panel (refer to FIG. 4) of the state display apparatus 20 will be referred to as a state display LED #m using a numerical value m (m=1 to 16) which is indicated below each state display LED 34. In addition, the margin display LED 35 forming a pair with the state display LED #m (the margin display LED 35 arranged above the state display LED #m) will be referred to as a margin display LED #m. Furthermore, a management object of which related information is displayed by the state display LED #m and the margin display LED #m will be referred to as a management object #m, and an m value will be referred to as a management object number.

Upon start of operation of the present state display system, a task for setting a device ID of each radio transmission apparatus 10 arranged (or to be subsequently arranged) in a vicinity of each management object #k (k=1 to 16) to the state display apparatus 20 is performed. This task is performed by, for example, connecting a computer to the state display apparatus 20 and operating the computer.

Figure 5:
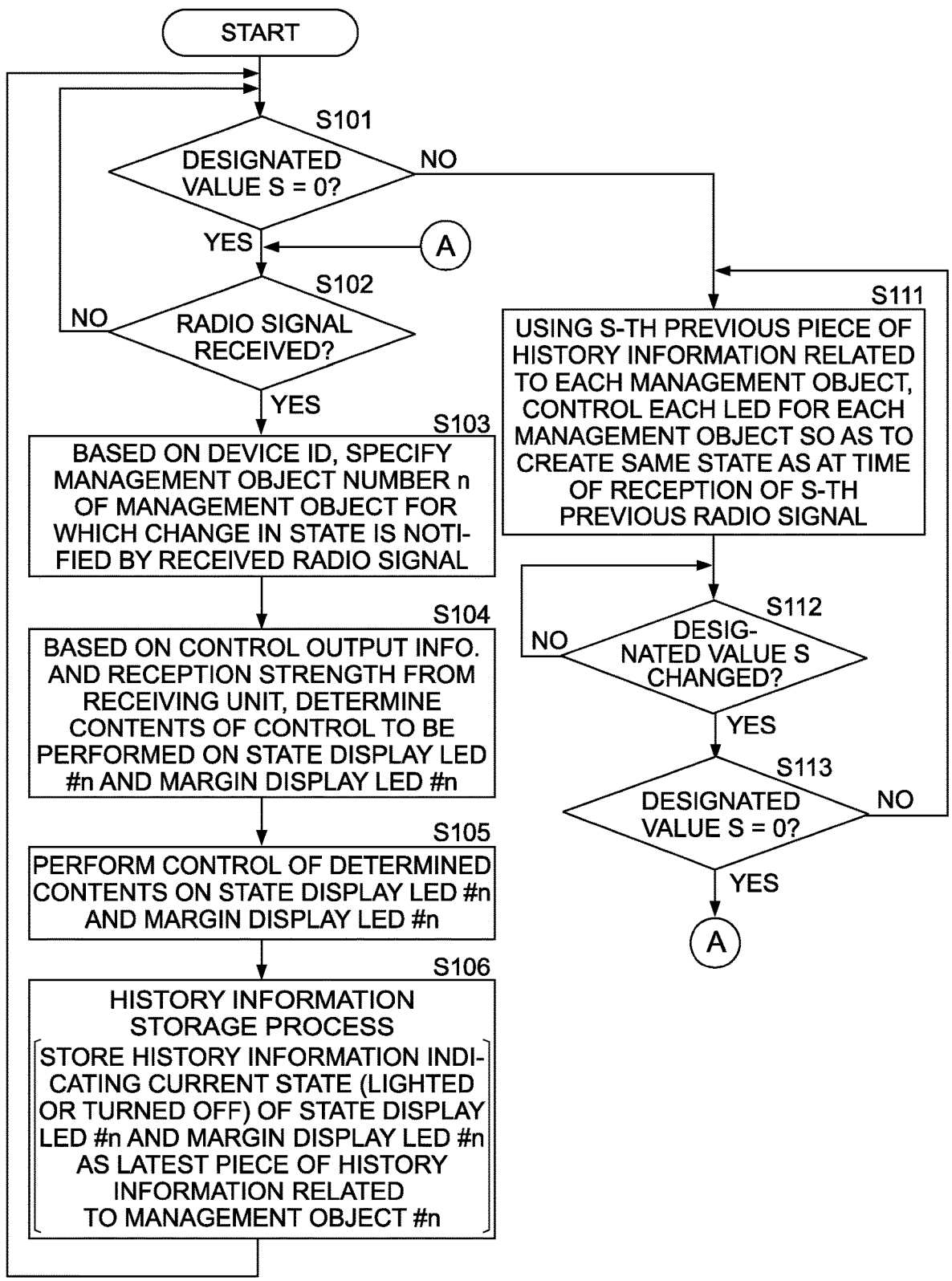
FIG. 5 is a flow chart of a display control process executed by a control unit in a state display apparatus of a state display system according to the first embodiment.

Once the task described above is performed, correspondence relationship information indicating a correspondence relationship between each of the plurality of management object numbers k and one or more device IDs is registered (stored) in the storage apparatus 23a. Subsequently, when registration of the correspondence relationship information is completed, the control unit 23 starts a display control process including a procedure shown in FIG. 5.

Specifically, the control unit 23 having started the display control process upon completion of registration of correspondence relationship information repetitively performs the processes of steps S101 and S102 in order to monitor whether or not the designated value S is "0" and whether or not a radio signal has been received by the receiving unit 22.

As described earlier, the receiving unit 22 notifies the control unit 23 of a device ID and control output information included in a received radio signal and a reception strength prescribed strength) of the radio signal only when the radio signal has a prescribed strength or more. Therefore, the process actually performed by the control unit 23 in step S102 is a process of monitoring a notification of a device ID, control output information, and a reception strength from the receiving unit 22.

When a radio signal is received by the receiving unit 22 (step S102: YES), based on the device ID notified by the receiving unit 22, the control unit 23 specifies the management object number n of a management object for which a change in a state thereof is notified by the current radio signal (step S103). In other words, in this step S103, the control unit 23 performs a process of reading, from the correspondence relationship information, the management object number n associated with the device ID notified by the receiving unit 22.

The control unit 23 having specified the management object number n determines contents of control to be performed on the state display LED #n and the margin display LED #n based on the control output information and the reception strength notified by the receiving unit 22 (step S104).

Specifically, in the present step S104, when the control output information included in the radio signal received by the receiving unit 22 (the control output information notified by the receiving unit 22) is ON information, the control unit 23 determines to light the state display LED #n, but when the control output information is OFF information, the control unit 23 determines to turn off the state display LED #n. In addition, when the reception strength of the radio signal received by the receiving unit 22 (the reception strength notified by the receiving unit 22) is equal to or higher than a threshold set in advance, the control unit 23 determines to light the margin display LED #n, but when the reception strength is lower than the threshold, the control unit 23 determines to turn off the margin display LED #n.

The control unit 23 having completed the process of step S104 performs control with the contents determined by the process with respect to the state display LED #n and the margin display LED #n (step S105).

Next, the control unit 23 performs a history information storage process (step S106). The history information storage process is a process of storing information indicating a current state (a lighted state/a turned-off state) of the state display LED #n and the margin display LED #n as a piece of latest history information related to the management object #n in the storage apparatus 23a. Moreover, the history information storage process performed by the control unit 23 is a process of storing a maximum of 16 pieces of latest history information in the storage apparatus 23a in such a way that an order of storage can be understood. Specifically, when the number of pieces of history information related to the management object #n stored in the storage apparatus 23a is equal to or less than 15, in the history information storage process, the current history information is additionally stored as a piece of latest history information. On the other hand, when the number of pieces of history information related to the management object #n stored in the storage apparatus 23a is 16, in the history information storage process, the history information related to the management object #n most previously stored in the storage apparatus 23a is rewritten by the current history information.

The control unit 23 having finished the process of step S106 returns to a state of monitoring whether or not the designated value S is "0" and whether or not a radio signal has been received by the receiving unit 22 by starting the processes of step S102 and thereafter.

When the designated value S is a value other than "0" (step S101: NO), based on an S-th previous piece of history information related to each management object, the control unit 23 controls the respective LEDs 34 and 35 related to each management object so that a same state as at the time of reception of an S-th previous radio signal is created (step S111). The process of the present step S111 is a process in which a piece of latest history information related to each management object stored in the storage apparatus 23a is handled as an immediately previous piece of history information.

The control unit 23 having finished the process of step S111 monitors (awaits) a change of the designated value S to another value within a range of 0 to 16 (step S112). Subsequently, when the designated value S is changed to another value within the range of 1 to 16 (step S112: YES, step S113: NO), the control unit 23 returns to step S111 and controls the respective LEDs 34 and 35 related to each management object using the S-th previous piece of history information related to each management object so that a same state as at the time of reception of the S-th previous radio signal is created.

In addition, when the designated value S is changed to 0 (step S112: YES, step S113: YES), the control unit 23 returns to step S102 and enters a state where the control unit 23 is determining whether or not the designated value S is "0" and whether or not a radio signal has been received by the receiving unit 22.

As described above, the state display apparatus 20 according to the present embodiment includes the margin display unit 25 (the plurality of margin display LEDs 35) on which is displayed a margin of radio communication between the state display apparatus 20 and each radio transmission apparatus 10. Consequently, the user of the state display apparatus 20 can comprehend, from each margin displayed on the margin display unit 25, a radio transmission apparatus 10 no longer capable of communicating with a radio signal in a favorable manner and determine a first action of failure recovery measures. Therefore, with the state display apparatus 20, a total number of man-hours required for solving a radio failure can be reduced.

Furthermore, the state display apparatus 20 has a history display function for displaying a monitoring history (a previous monitoring result of a state and a margin) with respect to each management object.

When communication between a certain radio transmission apparatus 10 and the state display apparatus 20 is interfered with by an object passing between the two apparatuses, the margin of communication with the radio transmission apparatus 10 recovers after being reduced. In addition, when a problem occurs in a communication function of a certain radio transmission apparatus 10 and/or the state display apparatus 20, the margin of communication with the radio transmission apparatus 10 remains in a reduced state.

Moreover, when a problem occurs in a communication function of the state display apparatus 20, normally, as described earlier, a problem occurs in radio communication between the state display apparatus 20 and all radio transmission apparatuses 10. Therefore, using the history display function of the state display apparatus 20 enables whether a communication failure is caused by a radio transmission apparatus 10, the state display apparatus 20, or an object existing between a radio transmission apparatus 10 and the state display apparatus 20 to be estimated.

Second Embodiment

Hereinafter, a configuration and operations of a state display system according to a second embodiment will be described with a focus on differences from the state display system according to the first embodiment. It should be noted that the respective state display systems according to the second to seventh embodiments described hereinafter are systems which only differ from the state display system according to the first embodiment in a configuration and operations of the state display apparatus 20. Therefore, only the configuration and operations of the state display apparatus 20 of the state display system according to each embodiment will be described below. In addition, in the following description, the state display apparatus 20 of the state display system according to an N-th embodiment (N=1 to 7) will also be referred to as an N-th state display apparatus 20.

Figure 6:
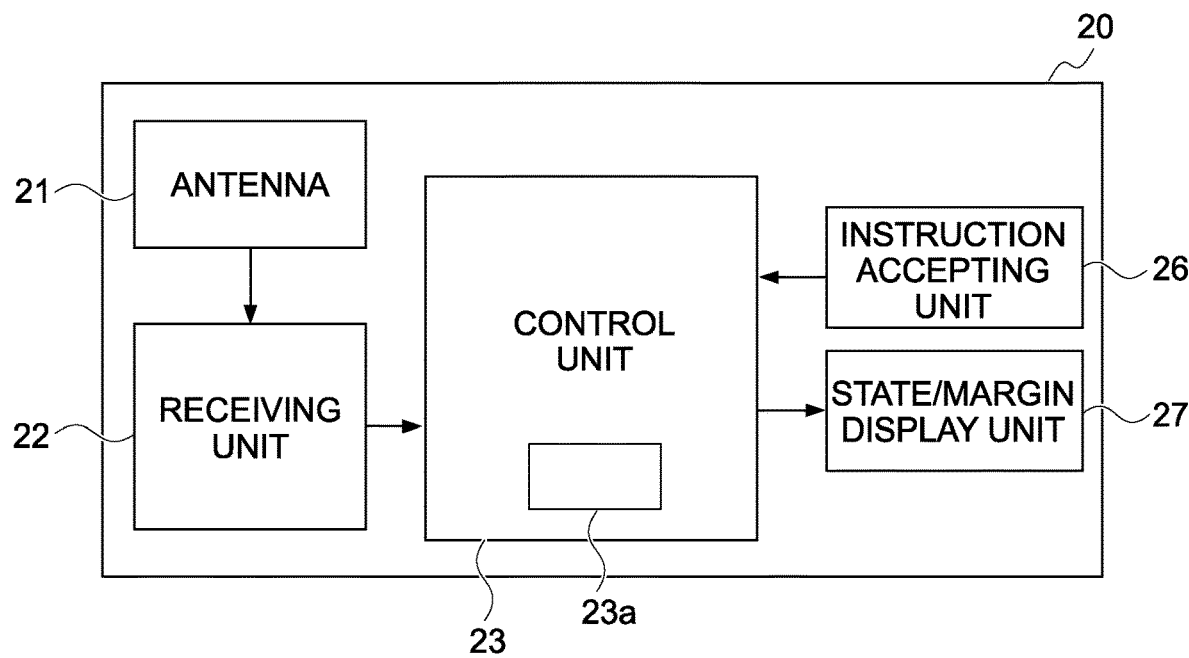
FIG. 6 is a schematic configuration diagram of a state display apparatus of a state display system according to a second embodiment of the present invention.
Figure 7:
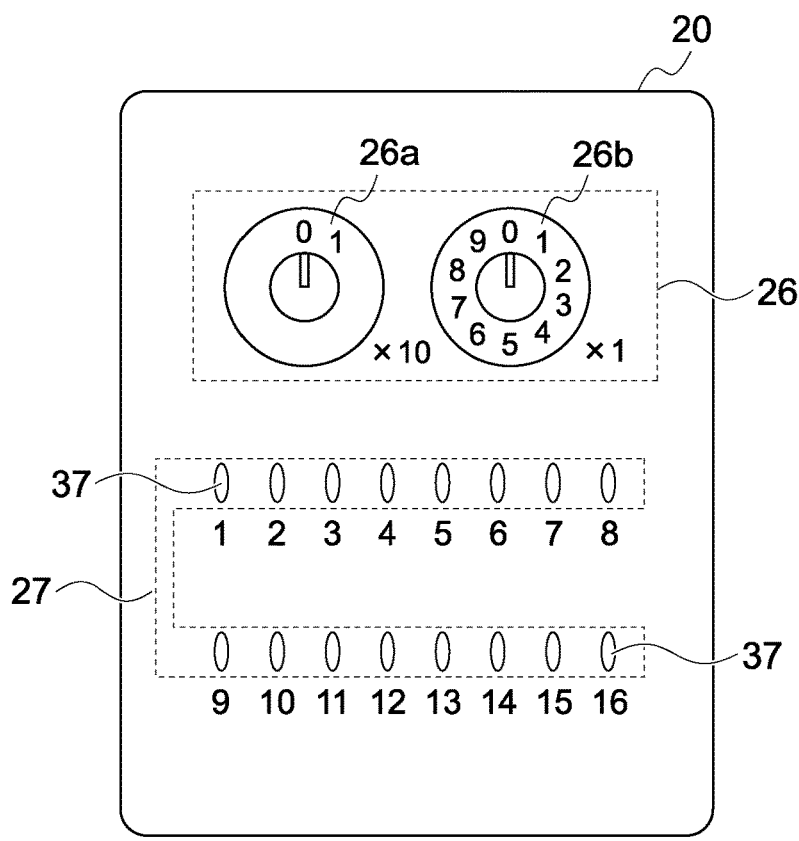
FIG. 7 is a schematic external view of a state display apparatus of a state display system according to the second embodiment.

FIGS. 6 and 7 respectively show a schematic configuration diagram and a schematic external view of a second state display apparatus 20.

As shown in FIG. 6, in terms of hardware, the second state display apparatus 20 is an apparatus in which the margin display unit 25 and the state display unit 24 of the first state display apparatus 20 (refer to FIG. 3) are replaced with a state/margin display unit 27.

As shown in FIG. 7, the state/margin display unit 27 is constituted by 16 state/margin display LEDs 37 arranged on a front panel of the state display apparatus 20. Each state/margin display LED # is a full-color LED which displays information (a state and a margin) related to a specific management object. Hereinafter, each of the state/margin display LEDs 37 arranged on the front panel of the state display apparatus 20 will be referred to as a state/margin display LED #m using a numerical value m (m=1 to 16) which is indicated below each state/margin display LED 37. In addition, a management object of which related information is displayed by the state/margin display LED #m will be referred to as a management object #m, and an m value will be referred to as a management object number.

Figure 8:
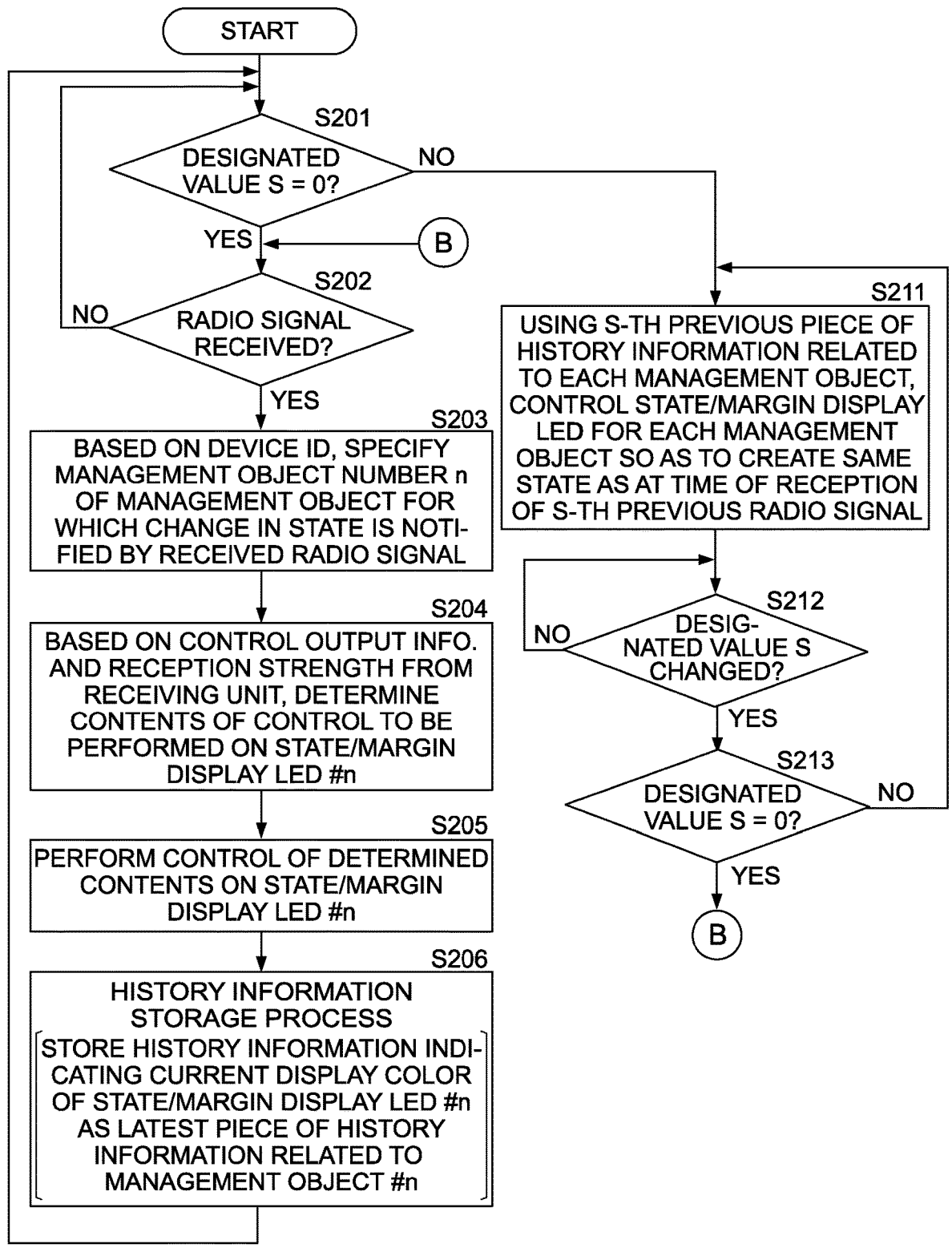
FIG. 8 is a flow chart of a display control process executed by a control unit in a state display apparatus of a state display system according to the second embodiment.

The control unit 23 of the second state display apparatus 20 is a unit which differs from the control unit 23 of the first state display apparatus 20 only in contents of a display control process to be executed. The control unit 23 of the second state display apparatus 20 is configured (programmed) to perform a display control process including a procedure shown in FIG. 8.

Specifically, upon completion of registration of correspondence relationship information, the control unit 23 repetitively performs the processes of determining whether or not the designated value S (a value indicated by the rotary switches 26a and 26b) is "0" and whether or not a radio signal has been received by the receiving unit 22 (steps S201 and S202). In addition, when a radio signal is received by the receiving unit 22 (step S202: YES), based on the device ID notified by the receiving unit 22, the control unit 23 specifies the management object number n of a management object for which a change in a state thereof is notified by the current radio signal (step S203).

The control unit 23 having specified the management object number n determines contents of control to be performed on the state/margin display LED #n based on the control output information and the reception strength notified by the receiving unit 22 (step S204).

In the present step S204, the control unit 23 determines whether the control output information included in the radio signal received by the receiving unit 22 (the control output information notified by the receiving unit 22) is ON information or OFF information. In addition, the control unit 23 determines whether or not the reception strength of the radio signal received by the receiving unit 22 (the reception strength notified by the receiving unit 22) is equal to or higher than a threshold set in advance.

In addition, based on each determination result, the control unit 23 determines contents of control to be performed on the state/margin display LED #n as follows and subsequently ends the process of step S204.

Control output information=ON information and reception strength≥threshold→emit light in green
Control output information=ON information and reception strength≤threshold→emit light in yellow
Control output information=OFF information and reception strength≥threshold→emit light in blue
Control output information=OFF information and reception strength<threshold→emit light in light blue The control unit 23 having completed the process of step S204 performs control with the contents determined by the process with respect to the state/margin display LED #n (step S205).

Next, the control unit 23 performs a history information storage process (step S206). The history information storage process is a process which differs from the history information storage process performed in step S106 (refer to FIG. 5) only in that the history information to be stored is information indicating a current display color of the state/margin display LED #n.

The control unit 23 having finished the process of step S206 returns to a state of monitoring whether the designated value S becomes a value other than "0" and whether a radio signal is received by the receiving unit 22.

Subsequently, when the designated value S becomes a value other than "0" (step S201: NO), based on an S-th previous piece of history information related to each management object, the control unit 23 controls the state/margin display LED 37 for each management object so that a same state as at the time of reception of an S-th previous radio signal is created (step S211). The process of the present step S211 is a process in which a piece of latest history information related to each management object stored in the storage apparatus 23a is handled as an immediately previous piece of history information in a similar manner to the process of step S111.

The control unit 23 having finished the process of step S211 monitors (awaits) a change of the designated value S to another value within a range of 0 to 16 (step S212). Subsequently, when the designated value S is changed to another value within the range of 1 to 16 (step S212: YES, step S213: NO), the control unit 23 returns to step S211 and controls the state/margin display LED 37 related to each management object based on the S-th previous piece of history information related to each management object so that a same state as at the time of reception of the S-th previous radio signal is created.

In addition, when the designated value S is changed to 0 (step S212: YES, step S213: YES), the control unit 23 returns to step S202. Specifically, the control unit 23 returns to a state of monitoring whether or not the designated value S is "0" and whether or not a radio signal has been received by the receiving unit 22.

As described above, in a similar manner to the state display apparatus 20 according to the first embodiment, the state display apparatus 20 according to the present embodiment also has a function of displaying a margin of communication by a radio signal between the state display apparatus 20 and each radio transmission apparatus 10. Consequently, the user of the state display apparatus 20 can comprehend that communication with a radio transmission apparatus can no longer be performed in a favorable manner and determine a first action of failure recovery measures. Therefore, with the state display apparatus 20, a total number of man-hours required for solving a radio failure can be reduced.

Furthermore, the state display apparatus 20 according to the present embodiment is also capable of displaying a monitoring history (a previous monitoring result of a state and a margin) with respect to each management object. Therefore, based on a monitoring history of each management object, the user of the state display apparatus 20 can estimate whether a communication failure is caused by a radio transmission apparatus 10, the state display apparatus 20, or an object existing between a radio transmission apparatus 10 and the state display apparatus 20.

Third Embodiment

Hereinafter, a state display system according to a third embodiment of the present invention will be described with a focus on differences from the state display system according to the first embodiment.

A third state display apparatus 20 (the state display apparatus 20 of the state display system according to the third embodiment) includes the antenna 21, the receiving unit 22, the control unit 23, the state display unit 24, the margin display unit 25, and the instruction accepting unit 26 in a similar manner to the first state display apparatus 20 (the state display apparatus 20 of the state display system according to the first embodiment: refer to FIG. 3).

Figure 9:
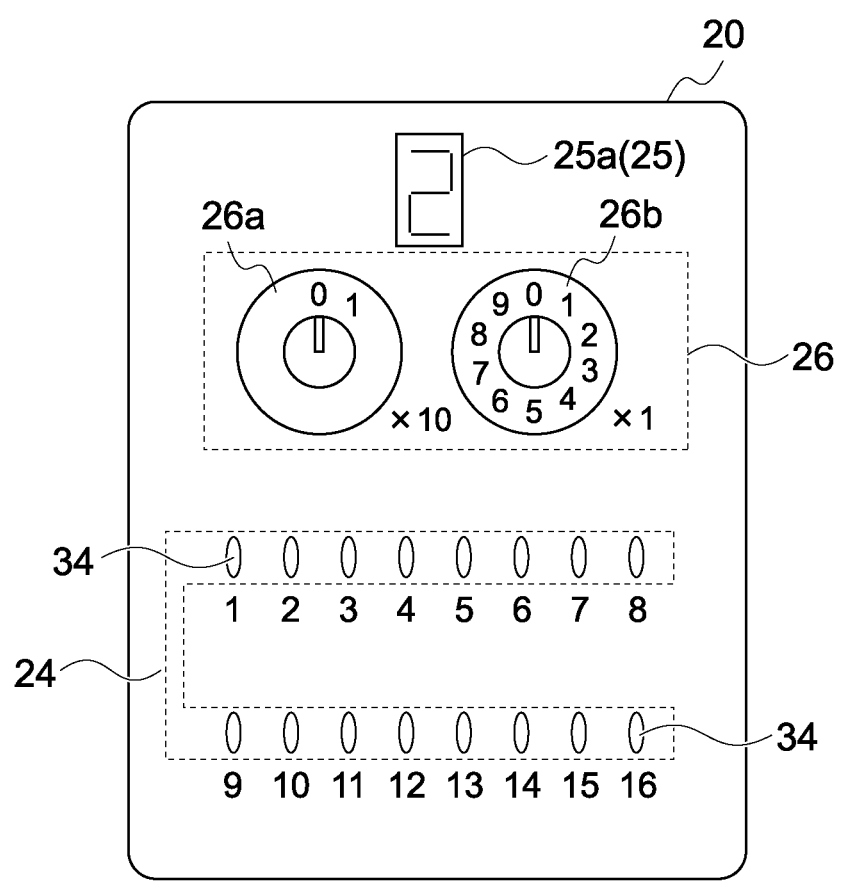
FIG. 9 is a schematic external view of a state display apparatus of a state display system according to a third embodiment of the present invention.

However, as shown in FIG. 9, in the third state display apparatus 20, a segment display 25a capable of displaying one-digit numerals is used as the margin display unit 25. In addition, instead of being configured to accept a display instruction of a monitoring history, the instruction accepting unit 26 (the rotary switches 26a and 26b) of the third state display apparatus 20 is configured to designate, by a management object number, a radio transmission apparatus 10 of which a margin of communication with the third state display apparatus 20 is to be displayed on the segment display 25a.

Figure 10:
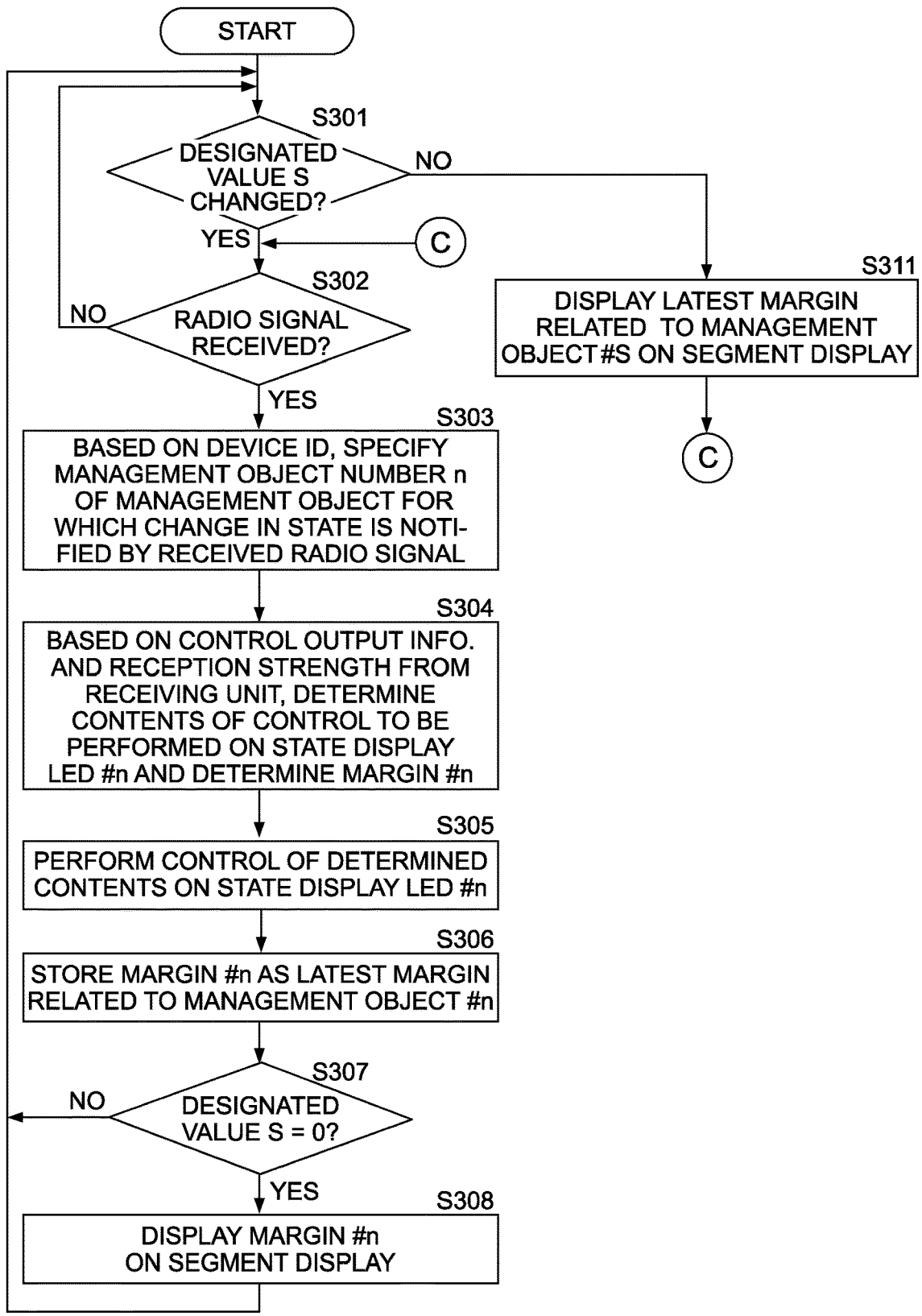
FIG. 10 is a flow chart of a display control process executed by a control unit in a state display apparatus of a state display system according to the third embodiment.

Furthermore, the control unit 23 of the third state display apparatus 20 is configured to perform a display control process including a procedure shown in FIG. 10 instead of the display control process including the procedure described above (FIG. 5).

Specifically, once registration of correspondence relationship information is completed, the control unit 23 repetitively makes the determinations of steps S301 and S302 in order to monitor whether the designated value S (a value indicated by the rotary switches 26a and 26b) is changed and whether a radio signal is received by the receiving unit 22.

When a radio signal is received by the receiving unit 22 (step S302: YES), based on the device ID from the receiving unit 22, the control unit 23 specifies the management object number n of a management object for which a change in a state thereof is notified by the current radio signal (step S303).

The control unit 23 having specified the management object number n determines contents of control to be performed on the state display LED #n based on the control output information notified by the receiving unit 22 (step S304). Specifically, when the control output information included in the radio signal currently received by the receiving unit 22 (the control output information currently notified by the receiving unit 22) is ON information, the control unit 23 determines to light the state display LED #n, but when the control output information is OFF information, the control unit 23 determines to turn off the state display LED #n.

In addition, in step S304, the control unit 23 also performs a process of determining a margin #n based on the reception strength notified by the receiving unit 22. In this case, the margin #n refers to a numerical value ranging from 1 to 3 which represents a margin of communication with the radio transmission apparatus 10 having notified by a radio signal that the state of a management object #n has changed. The control unit 23 determines the margin #n according to the following procedure.

The control unit 23 determines that a reception strength of the current radio signal is a reception strength included in any of first to third reception strength levels described below.

First reception strength level: equal to or higher than prescribed strength and lower than first threshold Second reception strength level: equal to or higher than first threshold and lower than second threshold Third reception strength level: equal to or higher than second threshold Moreover, as already described, a prescribed strength refers to a minimum strength of a radio signal which the receiving unit 22 uses to notify the control unit 23 of a device ID and control output information. In addition, the first threshold refers to a value set in advance which is greater than the prescribed strength and the second threshold refers to a value set in advance which is greater than the first threshold.

Furthermore, when the reception strength of the radio signal is a reception strength in a p-th reception strength level, the control unit 23 adopts p as the value of the margin #n.

The control unit 23 having completed the process of step S304 performs control with the contents determined by the process with respect to the state display LED #n (step S305). In addition, the control unit 23 stores the margin #n in the storage apparatus 23a as a latest margin related to the management object #n (step S306).

Next, the control unit 23 determines whether or not the designated value S and the management object number n match each other (step S307). When the designated value S and the management object number n match each other (step S307: YES), after performing a process of causing the margin #n to be displayed on the segment display 25a (step S308), the control unit 23 once again starts the processes of step S301 and thereafter. On the other hand, when the designated value S and the management object number n do not match each other (step S307: NO), the control unit 23 once again starts the processes of step S301 and thereafter without performing control with respect to the segment display 25a.

When the designated value S is changed while awaiting reception of a radio signal (step S301: YES), the control unit 23 causes the latest margin which is related to a management object #S and which is stored in the storage apparatus 23a to be displayed on the segment display 25a (step S311). Subsequently, the control unit 23 once again enters a state of awaiting reception of a radio signal and a change to the designated value S.

As described above, the state display apparatus 20 according to the present embodiment also has a function of displaying a margin of communication by a radio signal between the state display apparatus 20 and each radio transmission apparatus 10. Consequently, by changing the designated value S, the user of the state display apparatus 20 can comprehend, from each margin displayed on the segment display 25a, a radio transmission apparatus 10 no longer capable of communicating with a radio signal in a favorable manner and determine a first action of failure recovery measures. Therefore, with the state display apparatus 20, a total number of man-hours required for solving a radio failure can be reduced.

Fourth Embodiment

Hereinafter, a configuration and operations of a state display system according to a fourth embodiment of the present invention will be described with a focus on differences from the state display system according to the third embodiment.

Figure 11:
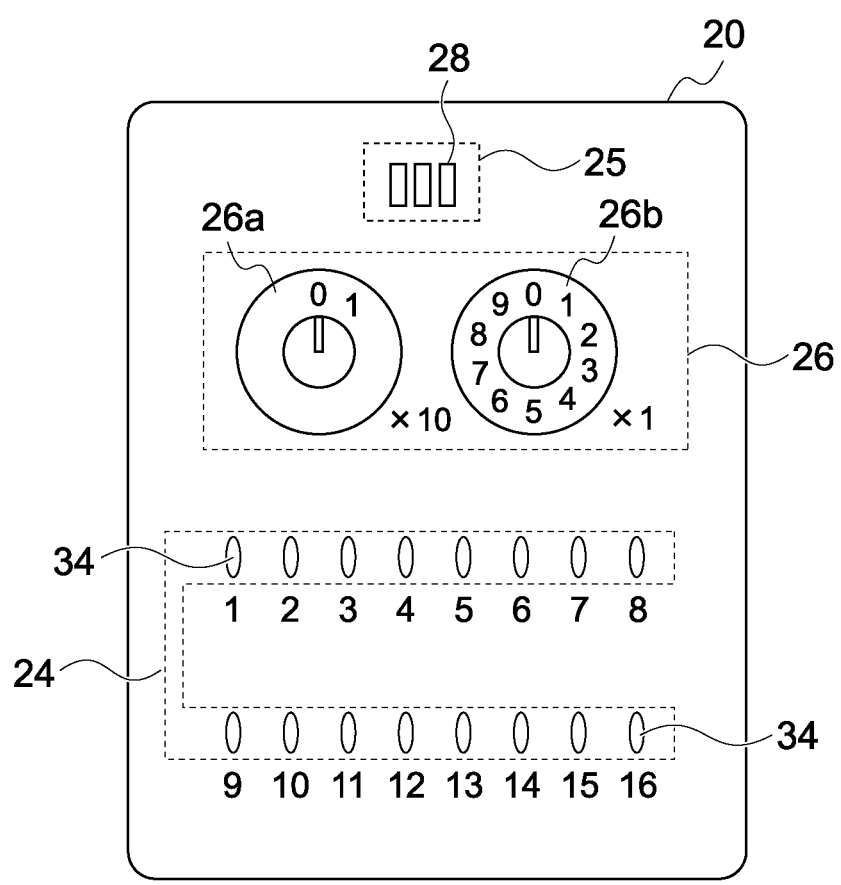
FIG. 11 is a schematic external view of a state display apparatus of a state display system according to a fourth embodiment of the present invention.

FIG. 11 shows a schematic external view of a fourth state display apparatus 20 (the state display apparatus 20 of a state display system according to the fourth embodiment).

As is apparent from a comparison between FIG. 11 and FIG. 9, the fourth state display apparatus 20 is an apparatus in which three LEDs 28 are provided in place of the segment display 25a of the third state display apparatus 20.

In addition, the control unit 23 of the fourth state display apparatus 20 is configured to perform a display control process in which the processes of steps S308 and S311 are respectively changed to a process of lighting the LEDs 28 of a same number as a margin #n and a process of lighting the LEDs 28 of a same number as a latest margin related to a management object #S.

The state display apparatus 20 according to the present embodiment also has a function of displaying a margin of communication by a radio signal between the state display apparatus 20 and each radio transmission apparatus 10. Therefore, even with the state display apparatus 20 according to the present embodiment, a presence or absence of a radio transmission apparatus 10 no longer capable of performing communication with a radio signal in a favorable manner and the like can be comprehended.

Fifth Embodiment

Hereinafter, a configuration and operations of a state display system according to a fifth embodiment of the present invention will be described with a focus on differences from the state display system according to the third embodiment.

Figure 12:
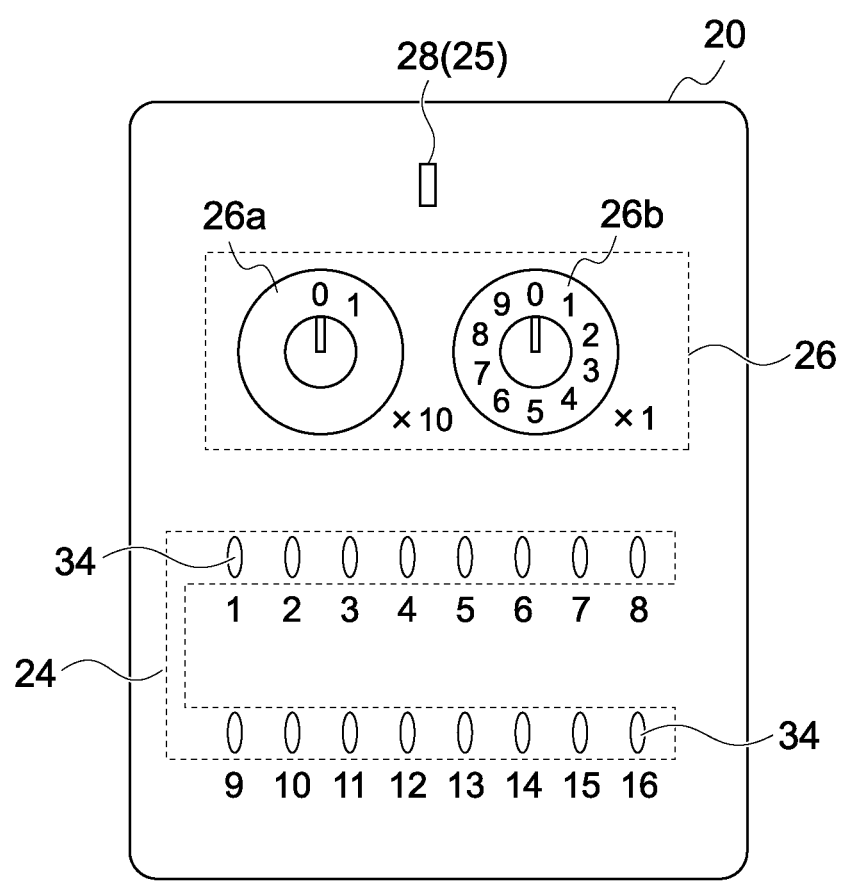
FIG. 12 is a flow chart of a display control process executed by a control unit in a state display apparatus of a state display system according to a fifth embodiment of the present invention.

FIG. 12 shows a schematic external view of a fifth state display apparatus 20 (the state display apparatus 20 of a state display system according to the fifth embodiment).

As is apparent from a comparison between FIG. 12 and FIG. 9, the fifth state display apparatus 20 is an apparatus in which one LED 28 is provided in place of the segment display 25a of the third state display apparatus 20.

In addition, the control unit 23 of the fifth state display apparatus 20 is configured to perform a display control process in which the processes of steps S308 and S311 are respectively changed to a process of causing the LED 28 to blink in a pattern in accordance with the margin #n and a process of causing the LED 28 to blink in a pattern in accordance with the latest margin related to the management object #S.

The state display apparatus 20 according to the present embodiment also has a function of displaying a margin of communication by a radio signal between the state display apparatus 20 and each radio transmission apparatus 10. Therefore, even with the state display apparatus 20 according to the present embodiment, a total number of man-hours required for solving a radio failure can be reduced.

Sixth Embodiment

Hereinafter, a state display system according to a sixth embodiment of the present invention will be described with a focus on differences from the state display system according to the third embodiment.

A sixth state display apparatus 20 (the state display apparatus 20 of the state display system according to the sixth embodiment) includes the antenna 21, the receiving unit 22, the control unit 23, the state display unit 24, the margin display unit 25, and the instruction accepting unit 26 in a similar manner to the first state display apparatus 20 (the state display apparatus 20 of the state display system according to the first embodiment: refer to FIG. 3).

Figure 13:
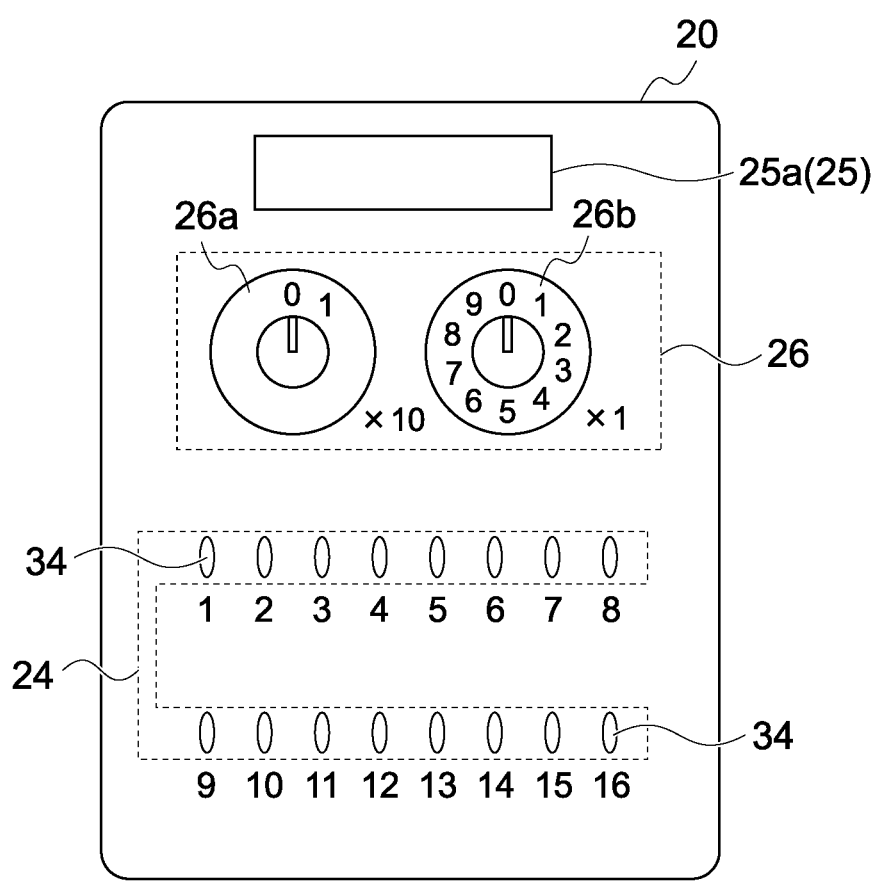
FIG. 13 is a schematic external view of a state display apparatus of a state display system according to a sixth embodiment of the present invention.

However, as shown in FIG. 13, in the sixth state display apparatus 20, a liquid crystal display 25b is used as the margin display unit 25.

Figure 14:
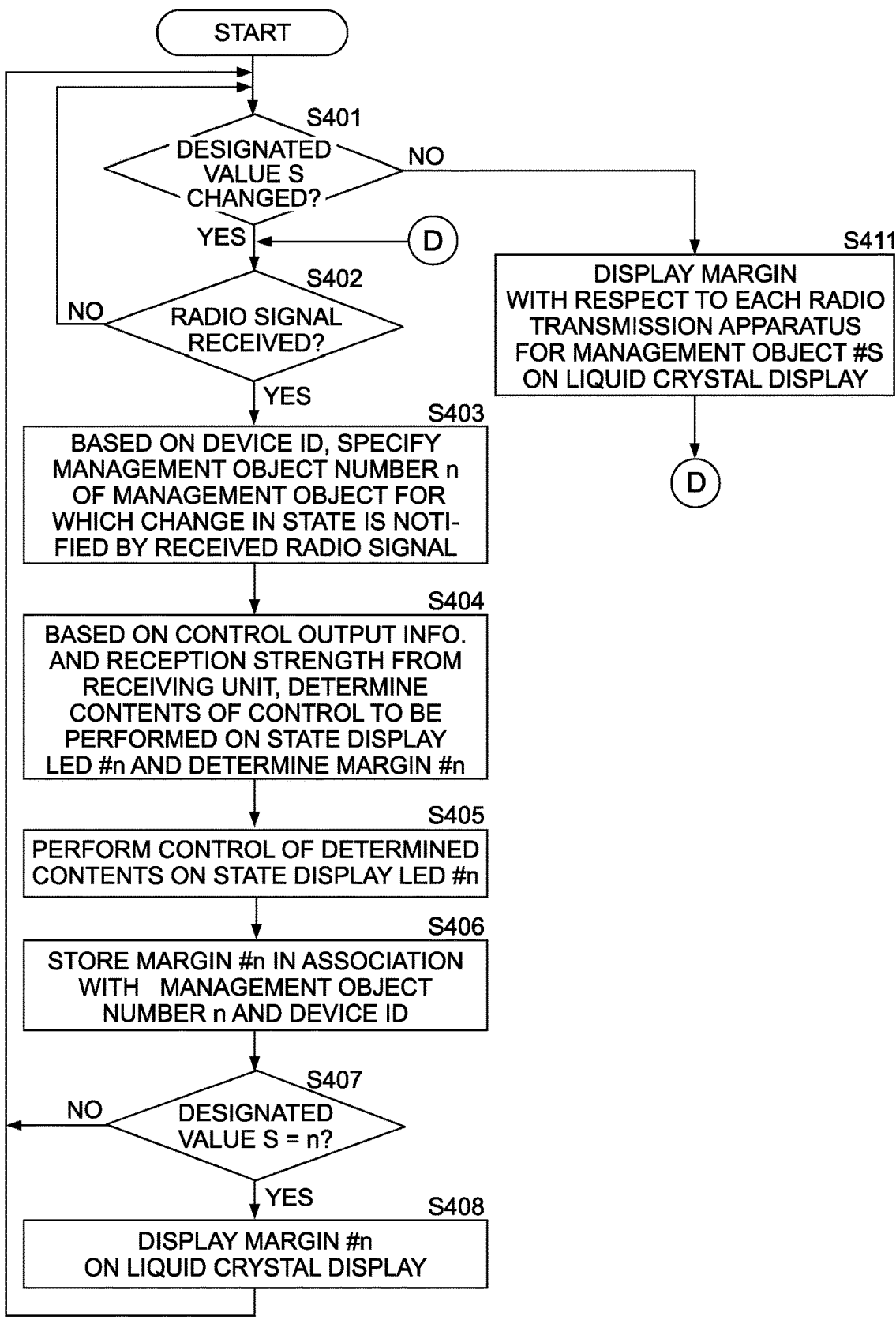
FIG. 14 is a flow chart of a display control process executed by a control unit in a state display apparatus of a state display system according to the sixth embodiment.

In addition, the control unit 23 of the sixth state display apparatus 20 is configured to perform a display control process including a procedure shown in FIG. 14 instead of the display control process including the procedure described above (FIG. 10).

Processes of steps S401 to S405 and S407 of the present display control process (FIG. 14) are respectively the same as the processes of steps S301 to S305 and S307 of the display control process shown in FIG. 10.

Specifically, once registration of correspondence relationship information is completed, the control unit 23 repetitively makes the determinations of steps S401 and S402 in order to monitor whether or not the designated value S (a value indicated by the rotary switches 26a and 26b) is "0" and whether or not a radio signal is received by the receiving unit 22.

When a radio signal is received by the receiving unit 22 (step S402: YES), based on the device ID from the receiving unit 22, the control unit 23 specifies the management object number n of a management object for which a change in a state thereof is notified by the current radio signal (step S403).

The control unit 23 having specified the management object number n determines contents of control to be performed on the state display LED #n based on the control output information notified by the receiving unit 22 and, at the same time, determines a margin #n based on the reception strength notified by the receiving unit 22 (step S404). In addition, the control unit 23 performs control with the contents determined by the process of step S404 with respect to the state display LED #n (step S405).

Subsequently, the control unit 23 stores the margin #n in the storage apparatus 23a in association with the management object number n and the device ID currently notified by the receiving unit 22 (step S406).

Next, the control unit 23 determines whether or not the designated value S and the management object number n match each other (step S407). When the designated value S and the management object number n match each other (step S407: YES), the control unit 23 causes the liquid crystal display 25b to display all margins stored in association with the management object number n in the storage apparatus 23a (step S408). Moreover, the processes performed by the control unit 23 according to the present embodiment in the present step S408 and step S411 to be described later are processes of causing the liquid crystal display 25b to display information (a numerical sequence) in which respective margins (numerical values ranging from 1 to 3) are arranged in an order of associated device IDs. However, the processes of steps S408 and S411 may be a process of causing the liquid crystal display 25b to display information in which the respective margins are arranged in another order or a process of causing the liquid crystal display 25b to display information in which device IDs are arranged before the respective margins.

When the designated value S and the management object number n do not match each other (step S407: NO), the control unit 23 once again starts the processes of step S401 and thereafter without performing control with respect to the liquid crystal display 25b.

When the designated value S is changed while awaiting reception of a radio signal (step S401: YES), the control unit 23 causes all margins which are associated with a management object number n and which are stored in the storage apparatus 23a to be displayed on the liquid crystal display 25b (step S411). Subsequently, the control unit 23 once again enters a state of awaiting reception of a radio signal and a change to the designated value S.

As described above, the state display apparatus 20 according to the present embodiment also has a function of displaying a margin of communication by a radio signal between the state display apparatus 20 and each radio transmission apparatus 10. Therefore, with this state display apparatus 20, a total number of man-hours required for solving a radio failure can be reduced.

In addition, with the state display apparatus 20 according to the present embodiment, a radio transmission apparatus 10 incapable of communicating with the state display apparatus 20 in a favorable manner can be specified even when a plurality of radio transmission apparatuses 10 that transmit a radio signal indicating that a state of each management object has changed are arranged in a vicinity of several management objects. Specifically, let us consider a case where a plurality of radio transmission apparatuses 10 that transmit a radio signal indicating that a state of a certain management object has changed are arranged in a vicinity of the management object and a problem occurs in communication between the state display apparatus 20 and one radio transmission apparatus 10 among the plurality of radio transmission apparatuses 10. In this case, while the state display apparatuses 20 according to the first to fifth embodiments are capable of realizing that a problem in communication has occurred between the state display apparatus 20 and one of the plurality of radio transmission apparatuses 10, the state display apparatuses 20 cannot recognize with which radio transmission apparatus 10 communication is problematic. On the other hand, with the state display apparatus 20 according to the present embodiment, a margin of communication can be displayed for each of a plurality of radio transmission apparatuses 10 arranged in a vicinity of a same management object. Therefore, by using the state display apparatus 20 according to the present embodiment, a radio transmission apparatus 10 incapable of communicating with the state display apparatus 20 in a favorable manner can be specified even when a plurality of radio transmission apparatuses 10 that transmit a radio signal indicating that a state of each management object has changed are arranged in a vicinity of several management objects.

Seventh Embodiment

Hereinafter, a state display system according to a seventh embodiment of the present invention will be described with a focus on differences from the state display system according to the first embodiment.

Figure 15:
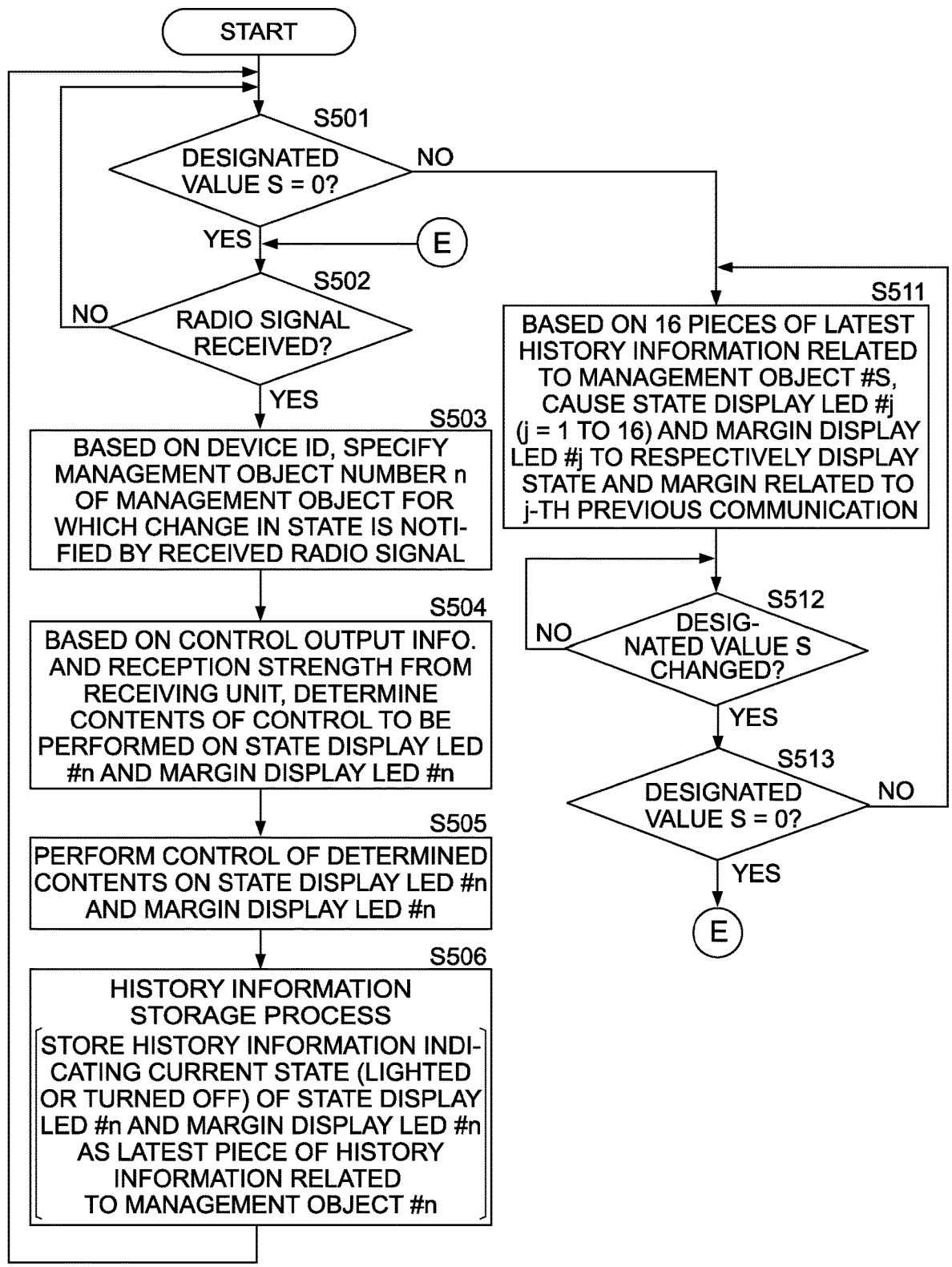
FIG. 15 is a flow chart of a display control process executed by a control unit in a state display apparatus of a state display system according to a seventh embodiment.

A seventh state display apparatus 20 (the state display apparatus 20 of a state display system according to the seventh embodiment) is an apparatus having a same hardware configuration as the first state display apparatus 20. However, the control unit 23 of the seventh state display apparatus 20 is configured (programmed) to perform a display control process including a procedure shown in FIG. 15 instead of the display control process shown in FIG. 5.

Processes of steps S501 to S506 of the present display control process (FIG. 15) are respectively the same as the processes of steps S101 to S106 described earlier. Specifically, the control unit 23 having started the present display control process (FIG. 15) due to completion of registration of correspondence relationship information repetitively performs the processes of steps S501 and S502 in order to monitor whether or not the designated value S is "0" and whether or not a radio signal has been received by the receiving unit 22.

When a radio signal is received by the receiving unit 22 (step S502: YES), based on the device ID notified by the receiving unit 22, the control unit 23 specifies the management object number n of a management object for which a change in a state thereof is notified by the current radio signal (step S503). Next, the control unit 23 determines contents of control to be performed on the state display LED #n and the margin display LED #n based on the control output information and the reception strength notified by the receiving unit 22 (step S504).

In addition, the control unit 23 performs control with the contents determined by the process of step S504 with respect to the state display LED #n and the margin display LED #n (step S505). In subsequent step S506, the control unit 23 performs a history information storage process of storing information indicating a current state (a lighted state/a turned-off state) of the state display LED #n and the margin display LED #n as a piece of latest history information related to the management object #n in the storage apparatus 23a.

The control unit 23 having finished the history information storage process returns to step S502. Specifically, the control unit 23 returns to a state of monitoring whether or not the designated value S is "0" and whether or not a radio signal has been received by the receiving unit 22.

When the designated value S becomes a value other than "0" (step S501: NO), based on 16 pieces of latest history information related to the management object #S, the control unit 23 performs a process of causing a state and a margin related to a j-th (j=1 to 16) previous communication to be respectively displayed by a state display LED #j and a margin display LED #j (step S511).

The control unit 23 having finished the process of step S511 monitors (awaits) a change of the designated value S to another value within a range of 0 to 16 (step S512). Subsequently, when the designated value S is changed to another value within the range of 1 to 16 (step S512: YES, step S513: NO), the control unit 23 returns to step S511 and, using history information related to a newly selected (designated) monitoring object, causes states and margins related to respective communications up to a 16th previous communication with respect to the monitoring object to be displayed by the state display LEDs #1 to 16 and the margin display LEDs #1 to 16.

In addition, when the designated value S is changed to 0 (step S512: YES, step S513: YES), by starting the processes of step S502 and thereafter, the control unit 23 returns to a state of monitoring whether or not the designated value S is "0" and whether or not a radio signal has been received by the receiving unit 22.

As is apparent from the description given above, the seventh state display apparatus 20 is configured as an apparatus in which, when a management object is designated by operating the instruction accepting unit 26, a monitoring history (a previous monitoring result of a state and a margin) up to a 16th previous monitoring result with respect to the management object is displayed by the state display LEDs #1 to 16 and the margin display LEDs #1 to 16. When communication between the seventh state display apparatus 20 and a certain radio transmission apparatus can no longer be performed in a favorable manner, based on a monitoring history of each management object, the user of the seventh state display apparatus 20 can estimate whether a communication failure is caused by a radio transmission apparatus 10, the state display apparatus 20, or an object existing between a radio transmission apparatus 10 and the state display apparatus 20. In addition, since the user can determine a first action of failure recovery measures by also using a result of the estimation, the state display apparatus 20 can reduce a total number of man-hours required for solving a radio failure.

Eighth Embodiment

Hereinafter, a configuration and operations of a state display system according to an eighth embodiment of the present invention will be described with a focus on differences from the state display system according to the first embodiment.

The state display system according to the eighth embodiment (hereinafter, also referred to as an eighth state display system) is a system constituted by a plurality of radio transmission apparatuses 10 and one state display apparatus 20 in a similar manner to the state display system according to the first embodiment (refer to FIG. 1).

Figure 16:
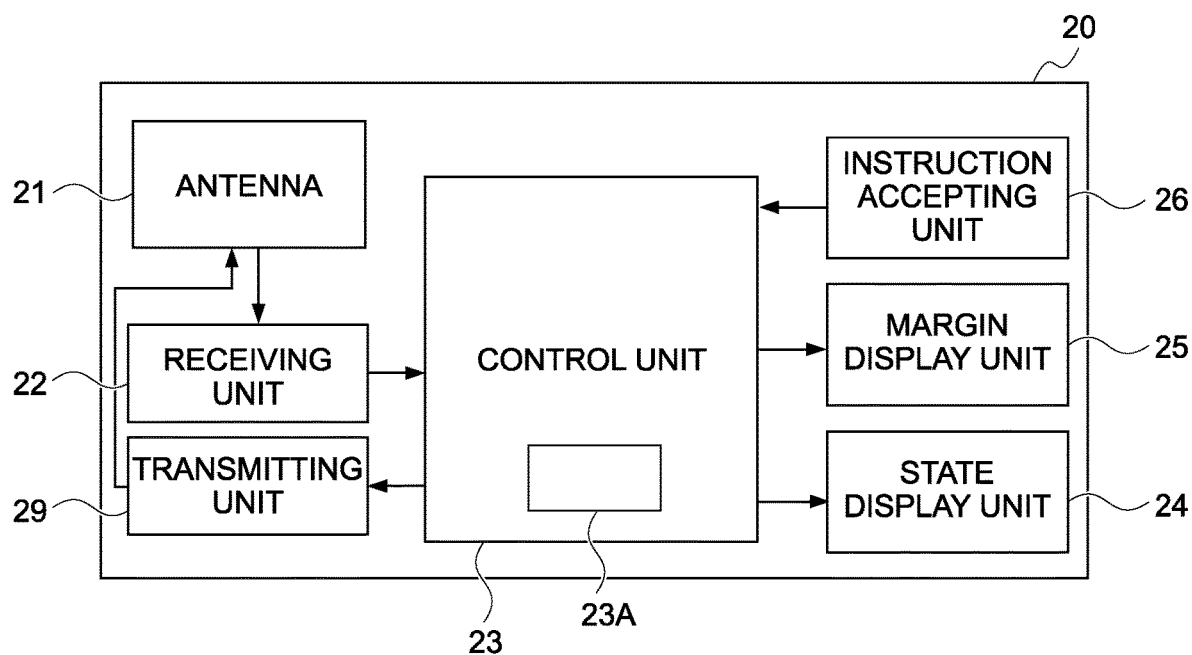
FIG. 16 is a schematic configuration diagram of a state display apparatus of a state display system according to an eighth embodiment of the present invention.

FIG. 16 shows a schematic configuration of an eighth state display apparatus 20 (the state display apparatus 20 of the eighth state display system).

The eighth state display apparatus 20 is an apparatus having a same appearance as the first state display apparatus 20 (FIG. 4). However, an internal configuration of the eighth state display apparatus 20 differs from that of the first state display apparatus 20 (refer to FIG. 3) and, as shown in FIG. 16, a transmitting unit 29 has been added to the eighth state display apparatus 20. The transmitting unit 29 is a unit which modulates a signal of which transmission is instructed by the control unit 23 and transmits the modulated signal from the antenna 21. The transmitting unit 29 transmits, from the antenna 21, a radio signal with a different frequency from a radio signal transmitted by the radio transmission apparatus 10.

Figure 17:
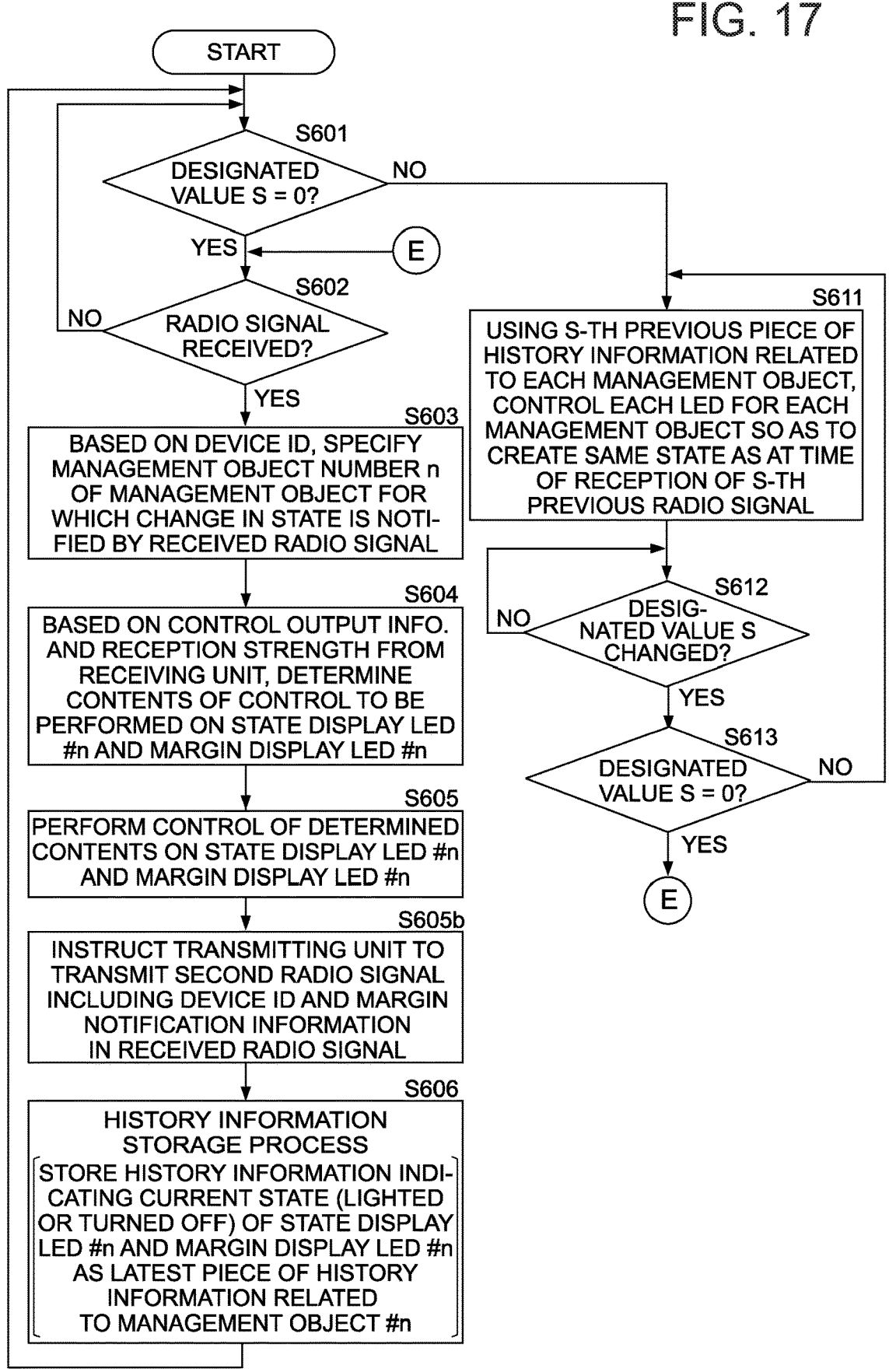
FIG. 17 is a flow chart of a display control process executed by a control unit in a state display apparatus of a state display system according to the eighth embodiment.

In addition, a program created to be used by the eighth state display apparatus 20 is stored in the storage apparatus 23a of the eighth state display apparatus 20. Furthermore, the control unit 23 of the eighth state display apparatus 20 executes a display control process including a procedure shown in FIG. 17 in accordance with the program.

Processes of steps S601 to S606 and S611 to S613 of the present display control process are respectively the same as the processes of steps S101 to S106 and S111 to S113 of the display control process (FIG. 5) executed by the control unit 23 of the first state display apparatus 20.

In other words, the control unit 23 of the eighth state display apparatus 20 basically operates in a similar manner to the control unit 23 of the first state display apparatus 20. However, the control unit 23 of the eighth state display apparatus 20 also performs, for each reception of a radio signal, a process (step S605b) of instructing the transmitting unit 29 to transmit a second radio signal including a device ID and margin notification information in the received radio signal. In this case, margin notification information refers to information indicating contents of control determined to be performed with respect to the margin display LED #n in the process of step S604. The margin notification information may be information directly indicating the contents of control determined to be performed with respect to the margin display LED #n in the process of step S604 or information indirectly indicating the contents of control (for example, a value indicating a size (a level) of margin).

Next, the radio transmission apparatus 10 of the eighth state display system will be described.

As each radio transmission apparatus 10, the eighth state display system uses a radio transmission apparatus which has a function for presenting the user with a margin of communication between the radio transmission apparatus and the eighth state display apparatus 20 based on the margin notification information in the second radio signal addressed to the radio transmission apparatus itself in addition to the radio signal transmission function described earlier.

Figure 18:
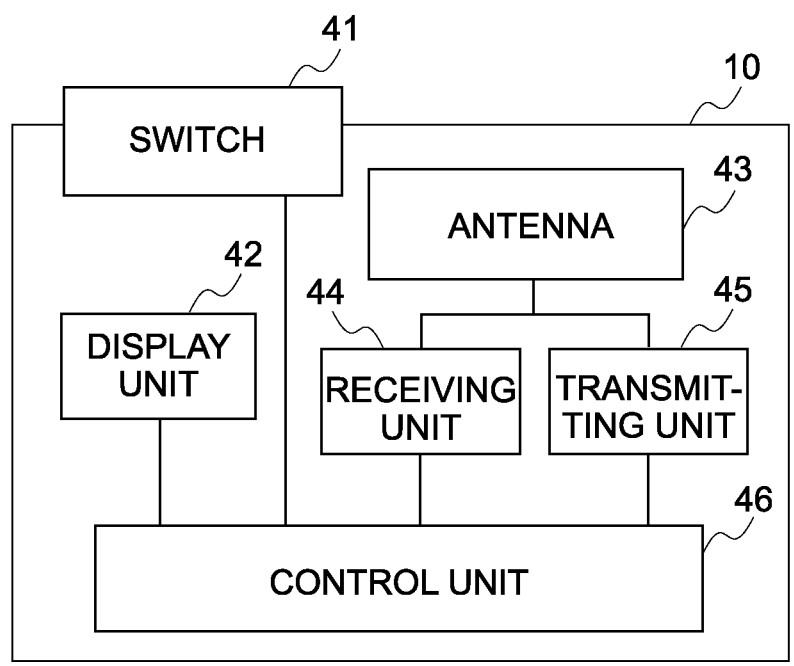
FIG. 18 is a schematic configuration diagram of a radio transmission apparatus of a state display system according to the eighth embodiment.

A hardware configuration of the radio transmission apparatus 10 which is used as a component of the eighth state display system is not particularly limited. For example, a radio transmission apparatus 10 such as that shown in FIG. 18 or, more specifically, a radio transmission apparatus 10 including a switch 41, a display unit 42, an antenna 43, a receiving unit 44, a transmitting unit 45, and a control unit 46 may be used as a component of the eighth state display system.

The radio transmission apparatus 10 is an apparatus in which power to each unit is supplied from a battery (not illustrated). The switch 41 is an ordinary push button switch with a built-in contact. The transmitting unit 45 is a unit which modulates a signal of which transmission is instructed by the control unit 46 and transmits the modulated signal from the antenna 43. The receiving unit 44 is a unit which retrieves and demodulates a signal with a prescribed frequency (a frequency of the second radio signal) from an output of the antenna 43 and notifies the control unit 46 of a result of the demodulation. The display unit 42 is a unit which displays a margin of communication by a radio signal. An LED or a segment display is used as the display unit 42.

In a similar manner to the control unit 13 (FIG. 2), the control unit 46 is a unit constituted by an integrated circuit such as a microprocessor, a setting mechanism which allows the user to set either ON information or OFF information as control output information to be included in a radio signal, and the like. A device ID is set to the integrated circuit of the control unit 46, and when the switch 41 is pressed down (when the contact of the switch 41 is connected), the control unit 46 (the integrated circuit) instructs the transmitting unit 45 to transmit a radio signal including the set device ID and control output information.

In addition, the control unit 46 monitors reception of a second radio signal addressed to its own radio transmission apparatus 10 by the antenna 43 (notification of a demodulation result including the set device ID from the receiving unit 44). Furthermore, when a second radio signal addressed to its own radio transmission apparatus 10 is received by the antenna 43, based on the margin notification information in the second radio signal, the control unit 46 controls the display unit 42 so that the user can comprehend a margin of communication with the state display apparatus 20 from contents displayed by the display unit 42. Moreover, contents displayed by the display unit 42 refer to a lighted state of an LED, a numerical value displayed on a segment display, or the like.

As is apparent from the description given above, the state display system according to the present embodiment has a configuration in which a margin of communication by a radio signal from each radio transmission apparatus 10 is displayed on the display unit 42 of each radio transmission apparatus 10. Consequently, in the state display system according to the present embodiment, a user of each radio transmission apparatus 10 can comprehend whether or not communication from the radio transmission apparatus 10 operated by the user can no longer be performed in a favorable manner. Therefore, the state display system according to the present embodiment functions as a system which enables an occurrence of a problem to be comprehend earlier by enabling a user of each radio transmission apparatus 10 to comprehend whether or not communication from the radio transmission apparatus 10 operated by the user can no longer be performed in a favorable manner.

Modifications

The state display systems according to the respective embodiments described above can be modified in various ways. For example, the state display apparatuses 20 (the control units 23) according to the respective embodiments are apparatuses which receive two types of radio signals (a radio signal including ON information and a radio signal including OFF information). However, the state display apparatuses 20 according to the respective embodiments can be modified into an apparatus which receives only one type of radio signal such as an apparatus which, when receiving a radio signal related to a certain management object in a situation where a state of the management object is a first state, assumes the state of the management object to be a second state and, when receiving a radio signal related to a certain management object in a situation where a state of the management object is a second state, assumes the state of the management object to be a first state. In addition, the state display apparatuses 20 according to the respective embodiments can also be modified into an apparatus which receives three or more types of radio signals. Moreover, for example, when modifying the state display apparatus 20 according to the first embodiment into such an apparatus, states of a same number as the number of types of radio signals (a lighted state, a turned-off state, a blinking state, and the like) may be defined as states of the state display LEDs 34. In addition, color LEDs may be adopted as the state display LEDs 34 and a different color may be assigned to each of a plurality of types of radio signals.

Furthermore, the state display LEDs 34 may be controlled as follows.

When previous control output information is ON information and current control output information is ON information: control state display LEDs 34 so as to enter a first operational state When previous control output information is ON information and current control output information is OFF information: control state display LEDs 34 so as to enter a second operational state When previous control output information is OFF information and current control output information is ON information: control state display LEDs 34 so as to enter a third operational state When previous control output information is OFF information and current control output information is OFF information: control state display LEDs 34 so as to enter a fourth operational state Moreover, when the state display LEDs 34 are monochromatic LEDs, for example, a lighted state, a turned-off state, a first blinking state, and a second blinking state in which the monochromatic LEDs blink in a different pattern from that of the first blinking state can be adopted as the first to fourth operational states. In addition, when the state display LEDs 34 are color LEDs, four states in which the color LEDs emit light in different colors can be adopted as the first to fourth operational states.

In addition, a history display function may be added to the state display apparatuses 20 according to the third to sixth embodiments, and a function for displaying a margin for each device ID may be added to the state display apparatuses 20 according to the first to fifth, seventh, and eighth embodiments.

The state display apparatus 20 and the radio transmission apparatus 10 of the state display system according to the eighth embodiment may be respectively modified into an apparatus which transmits a second radio signal also including state notification information indicating a state of a management object specified based on a received radio signal and an apparatus which displays a state and a margin of communication of the management object based on the received second radio signal.

In addition, a function for transmitting a second radio signal including margin notification information (and state notification information) and a function for displaying a margin (and a state of a management object) based on the margin notification information (and the state notification information) in a received second radio signal may be respectively added to the state display apparatuses 20 and the radio transmission apparatuses 10 of the state display systems according to the first to seventh embodiments.

The state display apparatuses 20 according to the respective embodiments may be modified into apparatuses which display margins in finer divisions. Specifically, for example, the state display apparatus 20 according to the first embodiment may be modified into an apparatus which turns off the margin display LEDs when a reception strength of a radio signal is lower than a prescribed strength (sufficient strength to comprehend contents of the radio signal), which causes the margin display LEDs to blink when the reception strength of the radio signal is equal to or higher than the prescribed strength and lower than a threshold, and which lights the margin display LEDs when the reception strength of the radio signal is equal to or higher than the threshold.

An apparatus which must be mounted with a battery or an apparatus which needs to be connected to a power supply may be adopted as all of or a part of the radio transmission apparatuses 10 of the state display systems according to the first to seventh embodiments. In addition, an apparatus which need not be operated by a user such as an apparatus which transmits a radio signal when a prescribed signal is input from an external apparatus or an apparatus which includes a sensor for measuring some kind of a physical quantity and which transmits a radio signal with a change to an output of the sensor or the like as a trigger may be adopted as all of or a part of the radio transmission apparatuses 10 of the state display systems according to the respective embodiments.

Furthermore, it is needless to say that the instruction accepting unit 26 may be information input means other than the rotary switches 26a and 26b and that a margin to be displayed by the segment display 25a, the liquid crystal display 25b, and the like may be information (such as characters) other than numerical values.

What is claimed is:

1. A state display apparatus, comprising:
 a receiving unit which receives a radio signal from among radio signals transmitted by one or more radio transmission apparatuses, the radio signal indicating that a change has occurred in a state of a management object associated with a respective radio transmission apparatus of the one or more radio transmission apparatuses that is a transmission source of the radio signal;
 an accepting unit which accepts a designation of a management object to be a display object of a margin of communication by the radio signal;
 a display unit which displays a current state of each management object associated with the one or more radio transmission apparatuses and which, for each management object, displays the margin of communication by the radio signal between the state display apparatus and the respective management object designated as a display object of the margin of communication; and
 a control unit which, based on a respective radio signal of the radio signals received by the receiving unit, specifies a respective management object for which a change in a state thereof is notified by the radio signal and the state of the specified respective management object after the change, which causes the display unit to display the specified state after the change as a current state of the specified respective management object and, when the specified respective management object is designated as the display object of the margin of communication, further obtains the margin of communication by the respective radio signal from a reception strength of the respective radio signal received by the receiving unit and causes the display unit to display the obtained margin of communication, wherein
 the respective radio signal received by the receiving unit includes a device ID of the respective radio transmission apparatus of the one or more radio transmission apparatuses having transmitted the respective radio signal, and
 the control unit:
 holds correspondence relationship information indicating a correspondence relationship between each management object and the device ID of the respective radio transmission apparatus of the one or more radio transmission apparatuses transmitting the radio signal indicating that the state of the respective management object has changed;
 stores, each time the radio signal is received by the receiving unit, the margin of communication obtained from the reception strength of the received radio signal in association with the device ID included in the radio signal, in a storage apparatus; and
 when the management object of which the state is notified to have changed by the radio signal received by the receiving unit is designated as the display object of the margin of communication, specifies, based on the correspondence relationship information, the device ID of each radio transmission apparatus which transmits the radio signal indicating that the state of the management object has changed and which is not a transmission source of the radio signal, and causes the display unit to display the margin of communication stored in the storage apparatus in association with each specified device ID and the margin of communication obtained from the reception strength of the radio signal.

2. The state display apparatus according to claim 1, wherein
 the display unit includes a segment display, and
 the control unit causes a numerical value indicating the margin of communication by the radio signal to be displayed on the segment display of the display unit when the specified management object is designated as a display object of the margin of communication.

3. The state display apparatus according to claim 1, wherein
 the display unit includes a light emitting element, and
 the control unit causes the light emitting element of the display unit to blink in a pattern in accordance with the margin of communication by the radio signal when the specified management object is designated as the display object of the margin of communication.

4. The state display apparatus according to claim 1, wherein
 the display unit includes a plurality of light emitting elements which display the margin of communication by the radio signal, and
 the control unit changes the number of light emitting elements to be lighted among the plurality of light emitting elements of the display unit in accordance with the margin of communication by the radio signal when the specified management object is designated as the display object of the margin of communication.

5. A state display system, comprising:
 the state display apparatus according to claim 1; and
 a plurality of radio transmission apparatuses which respectively generate power from an operating force of a user and transmit the radio signal using generated power.

6. A state display system, comprising:
 the state display apparatus according to claim 1, further including a transmitting unit which transmits a second radio signal which indicates the margin of communication obtained from the reception strength of the radio signal received by the receiving unit and which is addressed to the respective radio transmission apparatus of the one or more radio transmission apparatuses that is the transmission source of the radio signal; and
 a plurality of radio transmission apparatuses each capable of transmitting the radio signal, and including a radio transmission apparatus-side receiving unit which receives the second radio signal addressed to the respective radio transmission apparatus from the state display apparatus, a display unit which displays the margin of communication, and a control unit which causes the display unit to display the margin of communication based on the second radio signal which is addressed to the respective radio transmission apparatus and which is received by the radio transmission apparatus-side receiving unit.

* * * * *